US010009490B2

(12) United States Patent
Ichiyama et al.

(10) Patent No.: US 10,009,490 B2
(45) Date of Patent: Jun. 26, 2018

(54) IMAGE FORMING SYSTEM, IMAGE FORMING APPARATUS, AND PROGRAM

(71) Applicant: Konica Minolta, Inc., Tokyo (JP)

(72) Inventors: Shohei Ichiyama, Aichi (JP); Takeshi Hibino, Aichi (JP); Hideyuki Hashimoto, Aichi (JP); Yuji Kawamura, Aichi (JP); Yukina Hisada, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days. days.

(21) Appl. No.: 15/350,232

(22) Filed: Nov. 14, 2016

(65) Prior Publication Data

US 2017/0142268 A1    May 18, 2017

(30) Foreign Application Priority Data

Nov. 16, 2015  (JP) ................................ 2015-224026

(51) Int. Cl.
*G06F 3/12*  (2006.01)
*H04N 1/00*  (2006.01)
*H04N 1/32*  (2006.01)

(52) U.S. Cl.
CPC ..... *H04N 1/00437* (2013.01); *H04N 1/00392* (2013.01); *H04N 1/00395* (2013.01);
(Continued)

(58) Field of Classification Search
CPC .......... H04N 1/00392; H04N 1/32106; H04N 1/00437; H04N 1/00411; H04N 1/00395;
(Continued)

(56) References Cited

U.S. PATENT DOCUMENTS

| | | | | |
|---|---|---|---|---|
| 2006/0098221 A1* | 5/2006 | Ferlitsch | ............ | H04N 1/00352 358/1.13 |
| 2007/0091010 A1* | 4/2007 | Richardson | ........ | H04N 1/00204 345/2.1 |

(Continued)

FOREIGN PATENT DOCUMENTS

| | | |
|---|---|---|
| JP | H08-018722 A | 1/1996 |
| JP | 2007-045105 A | 2/2007 |

(Continued)

OTHER PUBLICATIONS

Notice of Reasons for Rejection issued in corresponding Japanese Patent Application No. 2015-224026 dated Oct. 31, 2017, with translation (12 pages).

*Primary Examiner* — Neil R McLean
(74) *Attorney, Agent, or Firm* — Osha Liang LLP

(57) ABSTRACT

An image forming system includes an image forming apparatus and a communication terminal. The image forming apparatus communicates with the communication terminal and includes an operation panel that displays a first display screen and accepts an operation of inputting information, and a hardware processor. The communication terminal communicates with the image forming apparatus, displays a second display screen, and accepts input of information and includes a central processing unit (CPU) that notifies the input of the information to the image forming apparatus. The communication terminal transmits the information input in the input device to the image forming apparatus, and the hardware processor determines whether the status of the operation panel is a status that accepts the operation, and upon the status of the operation panel being the status that accepts the operation, switches the first display screen to a screen that accepts the operation.

18 Claims, 22 Drawing Sheets

(52) U.S. Cl.
CPC ..... *H04N 1/00411* (2013.01); *H04N 1/32106* (2013.01); *H04N 2201/0013* (2013.01); *H04N 2201/0094* (2013.01); *H04N 2201/3205* (2013.01); *H04N 2201/3208* (2013.01); *H04N 2201/3209* (2013.01)

(58) Field of Classification Search
CPC ... H04N 2201/0013; H04N 2201/0094; H04N 2201/3205; H04N 2201/3208; H04N 2201/3209
USPC ...................................................... 358/1.15
See application file for complete search history.

(56) References Cited

U.S. PATENT DOCUMENTS

| | | | | |
|---|---|---|---|---|
| 2014/0233053 | A1* | 8/2014 | Kakutani | G06F 3/1222 358/1.14 |
| 2014/0376042 | A1* | 12/2014 | Kawabata | H04N 1/00217 358/1.15 |
| 2015/0077781 | A1* | 3/2015 | Asai | H04N 1/00915 358/1.13 |

FOREIGN PATENT DOCUMENTS

| | | |
|---|---|---|
| JP | 2014-212500 A | 11/2014 |
| JP | 2015-005911 A | 1/2015 |
| JP | 2015-046179 A | 3/2015 |

\* cited by examiner

FIG. 17

DESTINATION REGISTRATION
PRESS OK KEY, THEN REGISTRATION NUMBER IS AUTOMATICALLY ADDED.
PRESS REGISTRATION NUMBER KEY, THEN REGISTRATION NUMBER IS SPECIFIED.

* TYPE OF DESTINATION
DESTINATION NUMBER
* REGISTRATION NAME
FURIGANA OF REGISTRATION NAME
SEARCH CHARACTERS

* HOST NAME
EXECUTE AUTHENTICATION CONFIRMATION ▶▶   CHANGE HOST NAME ▶▶
* FILE PATH
* USER NAME
* PASSWORD
REFERENCE ▶▶

REGISTER
CANCEL 530
531

FIG. 23
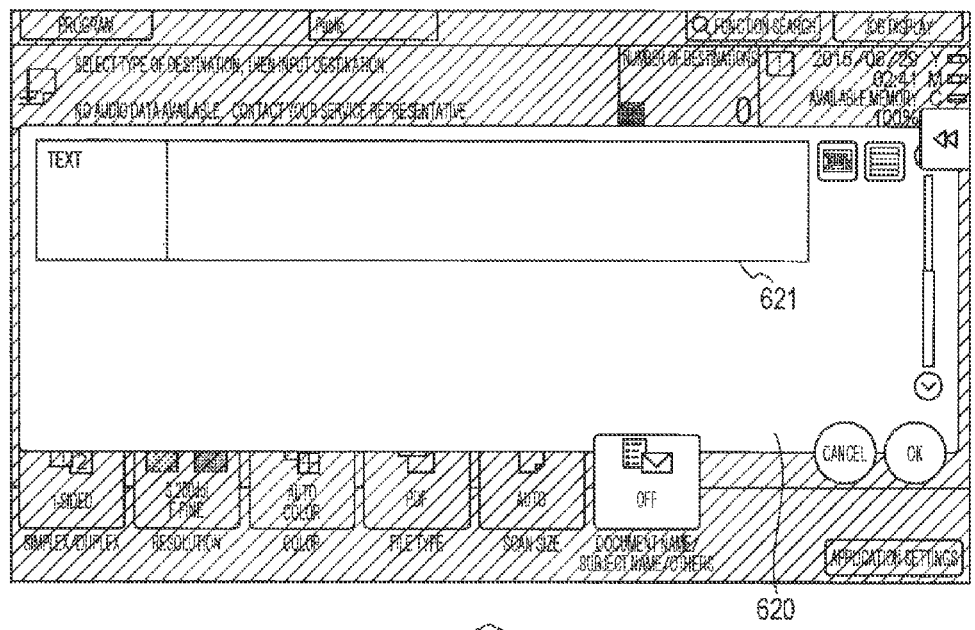
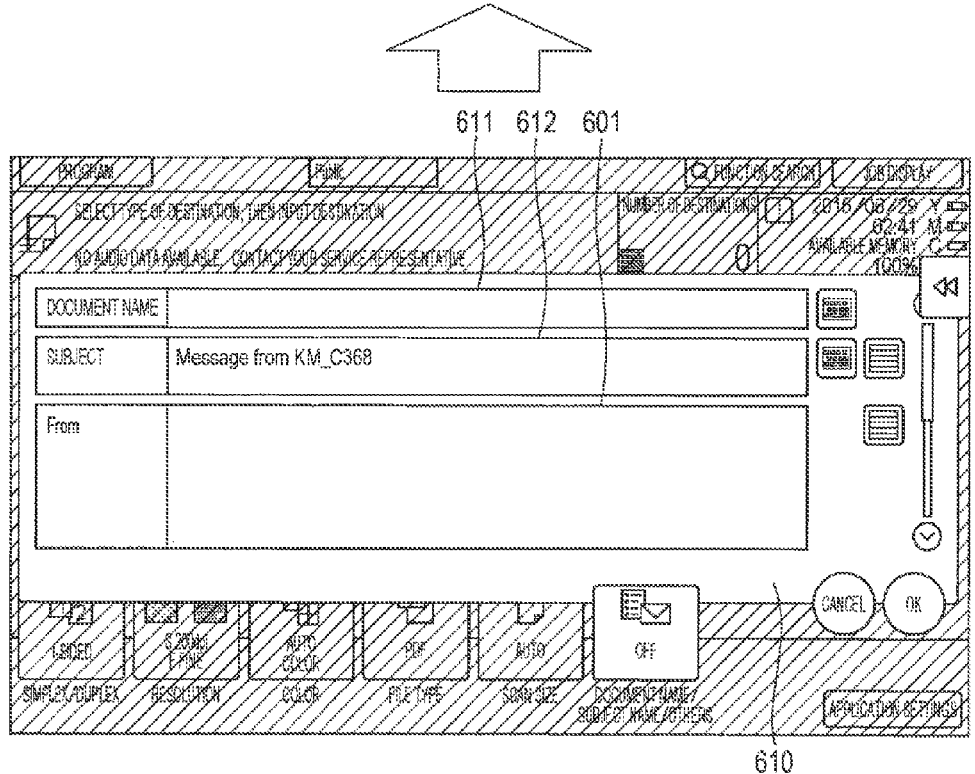

IMAGE FORMING SYSTEM, IMAGE FORMING APPARATUS, AND PROGRAM

The entire disclosure of Japanese Patent Application No. 2015-224026 filed on Nov. 16, 2015, including the description, claims, drawings, and abstract, is incorporated herein by reference in its entirety.

BACKGROUND OF THE INVENTION

Field of the Invention

The present disclosure relates to an image forming system, an image forming apparatus, and a program, and particularly relates to an image forming system to which information to be input into an image forming apparatus is transmitted from a communication terminal, an image forming apparatus that configures such an image forming system, and a program to be executed in the image forming apparatus.

Description of the Related Art

There has conventionally been a technology for displaying a screen that accepts the input of information, such as a screen including a software keyboard, on a display device by computer processing. For example, JP 2015-5911 A discloses an image forming system including an image forming apparatus and a remote control apparatus that remotely controls the image forming apparatus. In the image forming system, the remote control apparatus on which an operation screen is displayed switches the display of a character input screen on the operation screen according to character type information (information indicating the type of an input character on the character input screen) transmitted from the image forming apparatus.

JP 2015-46179 A discloses a display screen control method to be executed in a communication terminal. In the method, the placement of an area to display contents and an area to display an input character string is switched on a touchscreen of the communication terminal according to a users use.

In some known image forming systems, the communication terminal is simply used like a remote keyboard for the image forming apparatus. In such image forming systems, the image forming apparatus cannot accept the input of information such as text unless the image forming apparatus is in a status that accepts the input of the information when the communication terminal transmits the information to the image forming apparatus. Therefore, when transmitting information from the communication terminal to the image forming apparatus, a user of the communication terminal needs to check the operating status of the image forming apparatus and, if the operating status is not one that accepts the information from the communication terminal, operate the image forming apparatus for the purpose of changing the operating status. Therefore, the user is required to perform complicated operations.

SUMMARY OF THE INVENTION

One or more embodiments of the present invention allow a user to avoid complicated operations upon transmitting, from a communication terminal, information to be input into an image forming apparatus.

An image forming system according to one or more embodiments comprises an image forming apparatus; and a communication terminal, wherein the image forming apparatus includes a first communication unit configured to communicate with the communication terminal, an operating unit configured to display a first display screen and accept an operation of inputting information in accordance with the first display screen, and a hardware processor configured to control operation of the operating unit, the communication terminal includes a second communication unit configured to communicate with the image forming apparatus, an input unit configured to display a second display screen and accept input of information to be input into the image forming apparatus in accordance with the second display screen, and a notification unit configured to notify the input of the information to the image forming apparatus in response to the input of the information into the input unit, the second communication unit transmits the information input in the input unit to the image forming apparatus, and the hardware processor is configured to determine whether the status of the operating unit is a status that accepts the operation of inputting the information in response to the notification from the notification unit, and upon the status of the operating unit being the status that accepts the operation of inputting the information, switch the first display screen of the operating unit to a screen that accepts the operation of inputting the information.

An image forming apparatus according to one or more embodiments communicates with a communication terminal and comprises an operating unit configured to display a first display screen and accept an operation of inputting information in accordance with the first display screen; a hardware processor configured to control operation of the operating unit; and a communication unit configured to receive, from the communication terminal, a notification indicating that information to be input into the image forming apparatus is being input in accordance with a second display screen displayed on the communication terminal, wherein the hardware processor is configured to determine whether the operating unit is in a status that accepts the operation of inputting the information in response to the notification from the communication terminal, and upon the operating unit being in a status that does not accept the operation of inputting the information, switch the first display screen of the operating unit to a screen that accepts the operation of inputting the information.

A non-transitory recording medium according to one or more embodiments that stores a computer readable program to be executed by a hardware processor of an image forming apparatus capable of communicating with a communication terminal comprises the image forming apparatus, wherein the image forming apparatus includes an operating unit configured to accept an operation of inputting information, and the program causes the hardware processor to execute displaying a first display screen on the operating unit, receiving, from the communication terminal, a notification indicating that the information to be input into the image forming apparatus is being input in accordance with a second display screen displayed on the communication terminal, determining whether the operating unit is in a status that accepts the operation of inputting the information in response to the notification from the communication terminal, and upon the operating unit being in a status that does not accept the operation of inputting the information, switching the first display screen of the operating unit to a screen that accepts the operation of inputting the information.

BRIEF DESCRIPTION OF THE DRAWINGS

Features of one or more embodiments of the present invention will become more fully understood from the detailed description given hereinbelow and the appended drawings which are given by way of illustration only, and thus are not intended as a definition of the limits of the present invention, and wherein:

FIG. 17 is an example of a screen corresponding to a type "personal name";

FIG. 23 is an example of a screen corresponding to a type "text";

DESCRIPTION OF EMBODIMENTS

Figure 1:
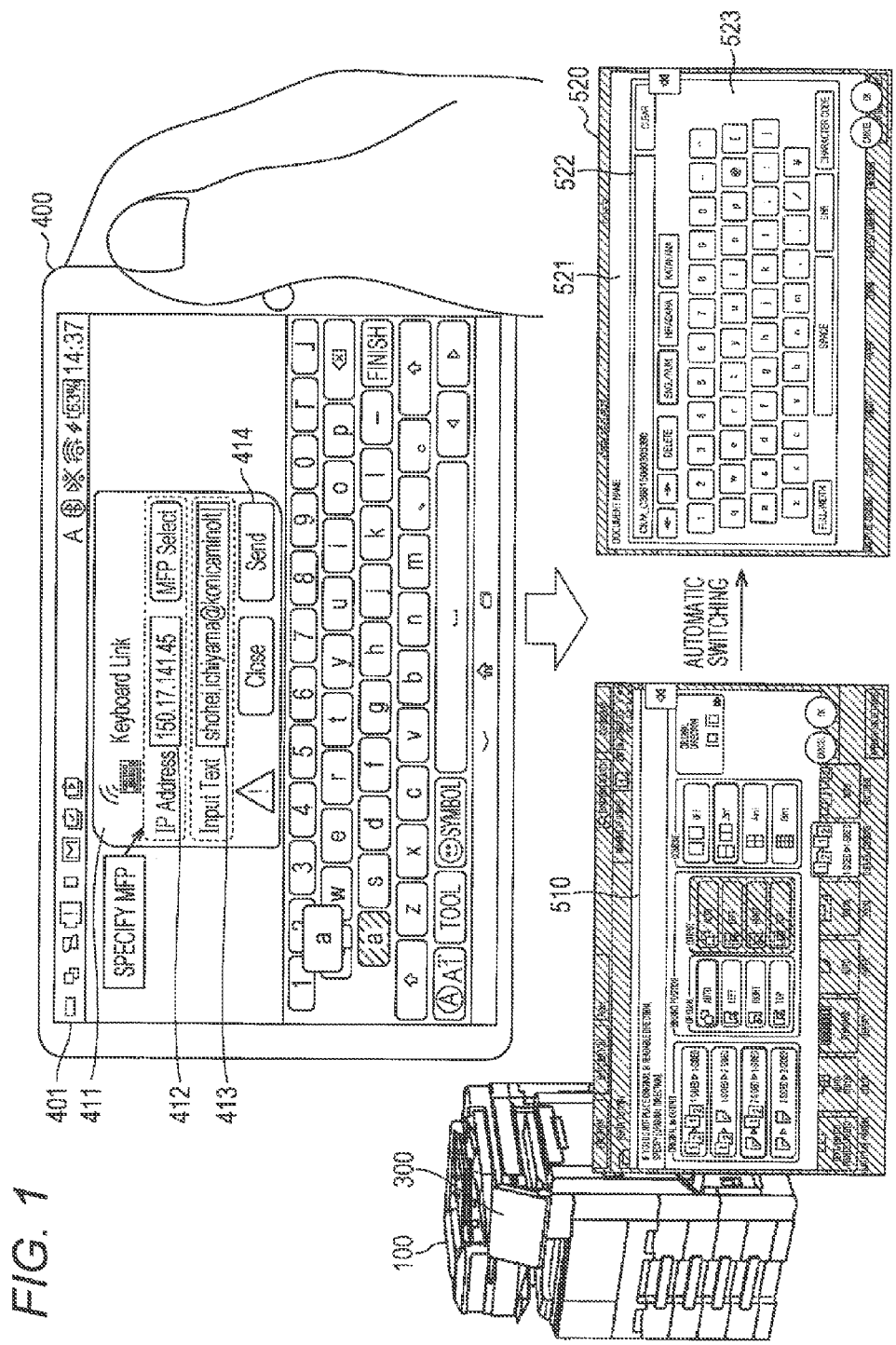
FIG. 1 is a diagram schematically illustrating a first example of an image forming system according to one or more embodiments.

Hereinafter, embodiments of an information processing apparatus will be described with reference to the drawings. However, the scope of the invention is not limited to the illustrated examples. In the following description, the same reference numerals are assigned to the same components and constituent elements. Their names and functions are also the same. Therefore, their descriptions are not repeated.

<1. Overview of the Disclosure>

FIG. 1 is a diagram schematically illustrating a first example of an image forming system according to one or more embodiments. As illustrated in FIG. 1, an image forming system 1 includes an MFP 100 being an example of an image forming apparatus, and a communication terminal 400. The communication terminal 400 is realized by an information communication terminal such as a smartphone.

(Basic Operation)

The MFP 100 includes an operation panel 300. The operation panel 300 includes a touchscreen (a touchscreen 320 in FIG. 4 and the like described below) that accepts an operation of inputting characters and the like.

The communication terminal 400 functions as a remote input device of the touchscreen of the MFP 100. In other words, a user can transmit information (such as characters) input on a display screen of the touchscreen of the MFP 100 from the communication terminal 400 to the MFP 100.

An example of the display screen (a screen 401) of the communication terminal 400 includes a window 411 having an address input field 412, an information input field 413, and a send button 414. When the user makes a transmission with the send button 415, the communication terminal 400 transmits, to the MFP 100, information input in the information input field 413.

When having received the information, the MFP 100 inputs the received information on the display screen on the touchscreen.

(Operation of when Status of Touchscreen of MFP does not Accept Input from Communication Terminal)

FIG. 1 illustrates a screen 510 as an example of a screen displayed on the touchscreen of the operation panel 300 of the MFP 100. The screen 510 is a screen for settings for an image forming operation in the MFP 100, and is not a screen for accepting the input of information (such as characters) transmitted from the communication terminal 400.

The communication terminal 400 notifies the MFP 100 that information is being input, during the input of the information into the information input field 413. In response to this, the MFP 100 determines whether the operating status of the operation panel 300 permits the input of the information intended to be transmitted from the communication terminal 400. When the operating status of the operation panel 300 does not permit the input of the information, the MFP 100 switches the operating status of the operation panel 300 to one that permits the input of the information.

In FIG. 1, the screen displayed on the touchscreen of the operation panel 300 is switched from the screen 510 to a screen 520. The screen 520 includes a window 521. The window 521 includes an input field 522 for inputting the information input in the information input field 413.

The window 521 includes a software keyboard 523. In the MFP 100, information can be input into the input field 522 also by operating the input field 522. Furthermore, the information input in the input field 522 can be corrected by an operation on the software keyboard 523.

<2. Overview of Process>

Figure 2:
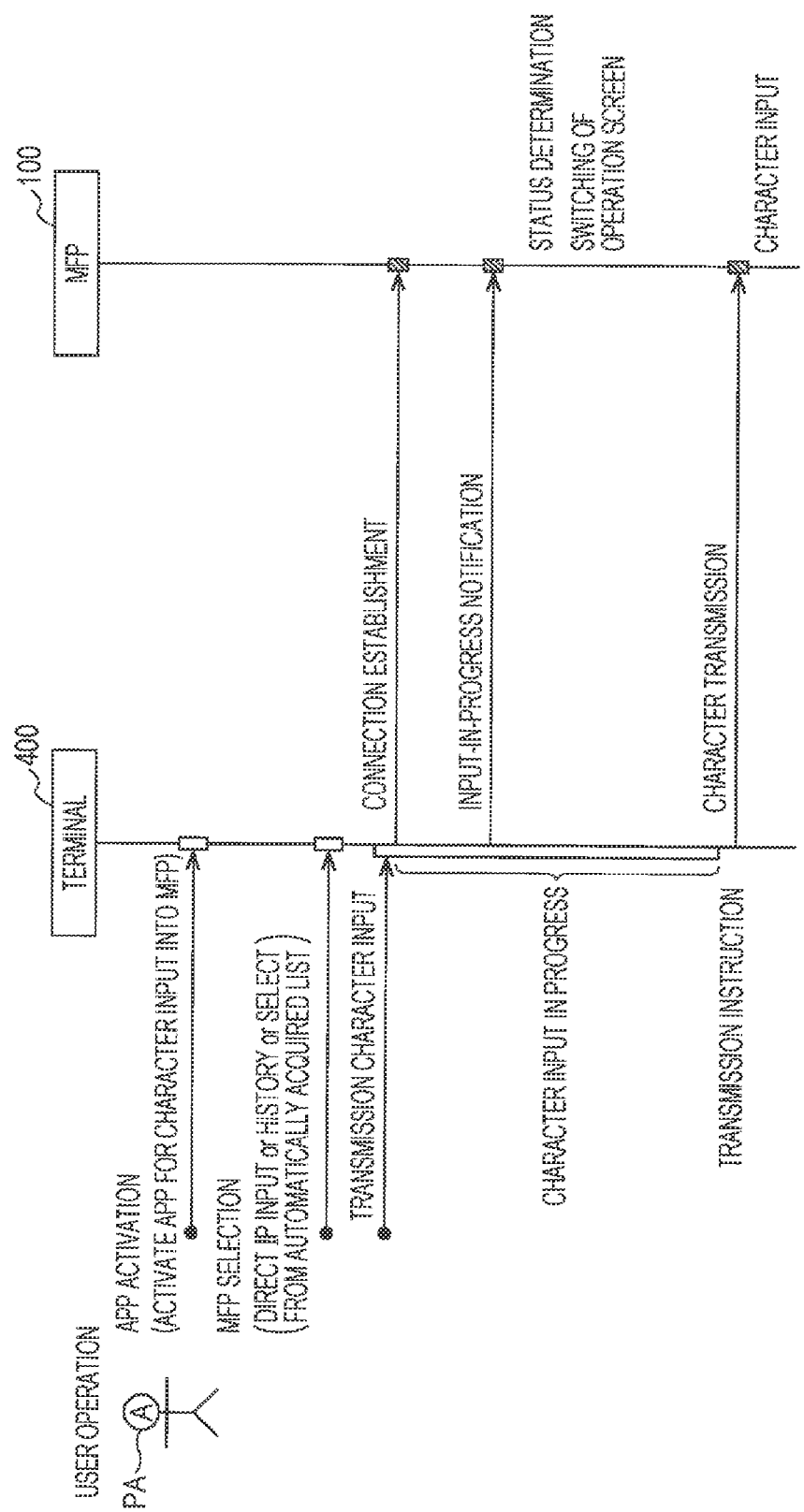
FIG. 2 is a diagram illustrating an overview of a process to be executed between a communication terminal and an MFP (Multi-Functional Peripheral) in the image forming system according to the first example.

FIG. 2 is a diagram illustrating an overview of a process to be executed between the communication terminal 400 and the MFP 100 in the image forming system according to the first example. As illustrated in FIG. 2, the communication terminal 400 activates an application (hereinafter referred to as "app") for displaying the window including the information input field 413, based on an operation by a user PA ("APP ACTIVATION" in FIG. 2). For example, a CPU 401 executes an application program stored in a storage device 403 to implement the application. The program may be stored in a recording medium detachable from the communication terminal 400, or may be stored in a storage device on a network.

The app selects an MFP being a transmission destination ("MFP SELECTION" in FIG. 2). In an example of the selection of an MFP being a transmission destination, the app reads out an address of an MFP being the previous information transmission destination. In other words, the app selects, as the transmission destination, an MFP identified from the address read out in another example, the app accepts the input of characters into the address input field 412. In other words, the app selects, as the transmission destination, an MFP identified from the input characters. Furthermore, in another example, the app acquires an IP (Internet Protocol) address of an MFP by WiFi (registered trademark: Wireless Fidelity) communication or the like. In other words, the app selects, as the transmission destination, an MFP identified from the acquired IP address. When addresses of two or more MFPs are acquired through WiFi communication or the like, an IP address of one MFP selected by the user from the two or more MFPs may be selected.

Next, the app accepts the input of characters to be transmitted to the MFP ("TRANSMISSION CHARACTER INPUT" in FIG. 2). The characters are input by the user PA operating a touchscreen of the communication terminal 400. The app establishes a connection between the communication terminal 400 and the MFP 100 selected as described above in response the input of the characters ("CONNECTION ESTABLISHMENT" in FIG. 2).

When the connection to the MFP has been established, the app notifies the MFP 100 that the Information is being input into the information input field 413 ("INPUT-IN-PROGRESS NOTIFICATION" in FIG. 2).

When having received the notification from the communication terminal 400, the MFP 100 executes a determination about the operating status of the operation panel 300 as described above ("STATUS DETERMINATION" in FIG. 2).

If having determined that the status of the operation panel 300 is a status that accepts the input of the information input in the information input field 413 of the communication terminal 400, the MFP 100 stands by without any further processing. On the other hand, if having determined that the status of the operation panel 300 is a status that cannot accept the input of the information input in the information input field 413, the status of the operation panel 300 is switched ("SWITCHING OF OPERATION SCREEN" in FIG. 2). Consequently, as described with reference to FIG. 1, the display on the touchscreen of the operation panel 300 is switched from the screen 510 to the screen 520.

When the send button 414 is operated ("TRANSMISSION INSTRUCTION" in FIG. 2) afterward, the app of the communication terminal 400 transmits the information input in the information input field 413 to the MFP 100.

When having received the information from the communication terminal 400, the MFP 100 inputs the received information on the screen displayed on the operation panel 300 ("CHARACTER INPUT" in FIG. 2).

<3. External Appearance of MFP)

Figure 3:
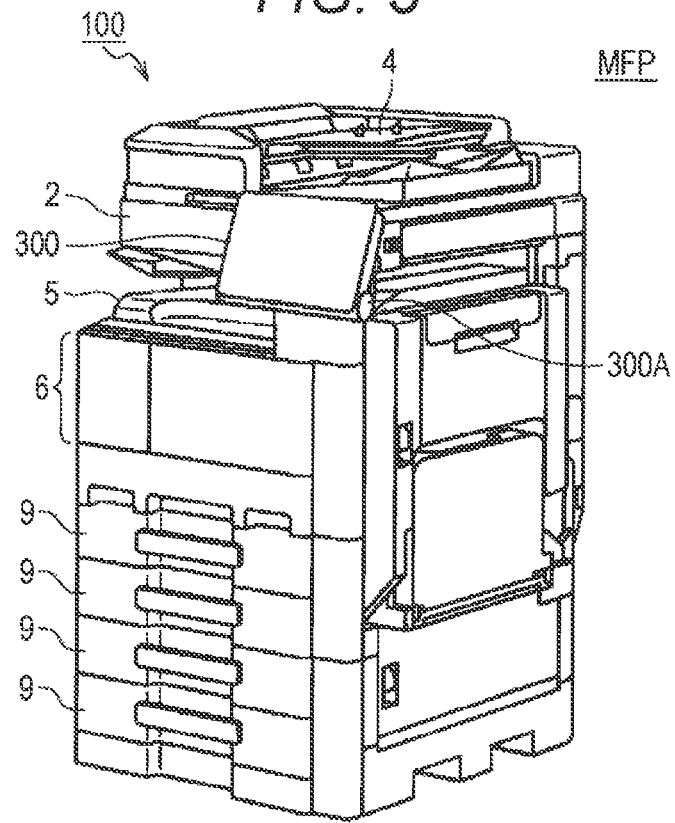
FIG. 3 is a perspective view illustrating the entire configuration of the MFP.

FIG. 3 is a perspective view illustrating the entire configuration of the MFP 100.

As illustrated in FIG. 3, the MFP 100 includes an image reading unit 2 that optically reads an original and obtains image data, and an image forming unit 6 that prints an image on a sheet of paper based on the image data. A feeder 4 that transmits the original to the image reading unit 2 is placed on a top surface of a main body of the MFP 100. A plurality of paper feeding units 9 that feeds a printing sheet to the image forming unit 6 is placed in a lower part of the MFP 100. A tray 5 into which the printing sheet on which the image has been formed by the image forming unit 6 is ejected is placed in a middle part of the MFP 100.

The operation panel 300 is mounted on a front side of an upper part of the main body of the MFP 100. The operation panel 300 is installed on the main body of the MFP 100 in a rotatable manner about a hinge 300A.

<4. External Appearance of Operation Panel>

Figure 4:
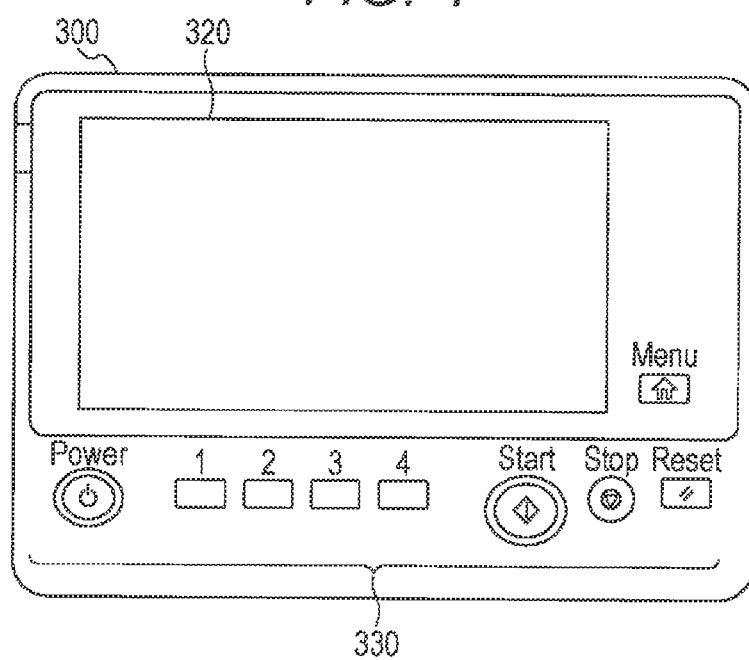
FIG. 4 is a diagram illustrating the external appearance of an operation panel.

FIG. 4 is a diagram illustrating the external appearance of the operation panel 300. The operation panel 300 includes the touchscreen 320 and hard keys 330. The touchscreen 320 displays information thereon and accepts an information input operation. The touchscreen 320 can employ a touchscreen of any type such as a resistive type and a capacitive type.

<5. Hardware Configuration of MFP>

Figure 5:
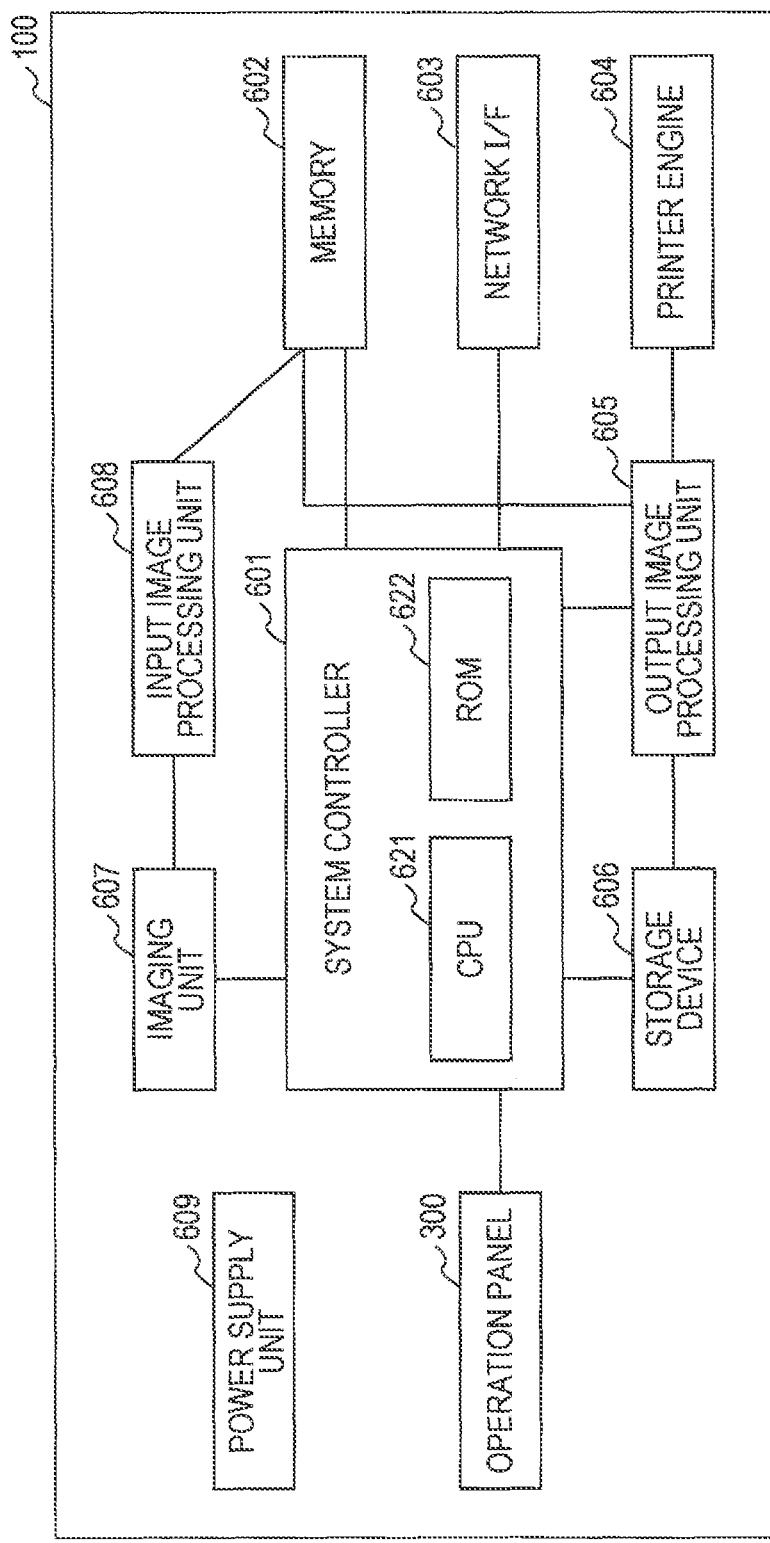
FIG. 5 is a block diagram illustrating the configuration of the MFP.

FIG. 5 is a block diagram illustrating the configuration of the MFP 100. As illustrated in FIG. 5, the MFP 100 includes a system controller 601, a memory 602, a network interface (I/F) 603, a printer engine 604, an output image processing unit 605, a storage device 606, an imaging unit 607, an input image processing unit 603, the operation panel 300, and a power supply unit 609. The system controller 601 is connected, via, for example, an internal bus, to the memory 602, the network I/F 603, the printer engine 604, the output image processing unit 605, the storage device 606, the imaging unit 607, the input image processing unit 603, and the operation panel 300.

Electric power is supplied from an external power source to the power supply unit 609. The system controller 601 controls the supply of power from the power supply unit 609 to the elements of the MFP 100. For example, when a power button on the operation panel 300 has been operated, the system controller 601 starts supplying power from the power supply unit 609 to the elements of the MFP 100. For example, when the power button on the operation panel 300 has been operated again, the system controller 601 stops the supply of power from the power supply unit 609 to the elements of the MFP 100.

The system controller 601 controls the entire MFP 100 over various jobs such as a scan job, a copy job, an email sending job, and a print job. The system controller 601 includes a CPU (Central. Processing Unit) 621 and a ROM (Read Only Memory) 622.

The CPU 621 executes a control program stored in the ROM 622. Various programs for control over the operation of the MFP 100 and various kinds of fixed data are stored in the ROM 622. The CPU 621 reads data from the memory 602 and writes data into the memory 602.

The memory 602 is, for example, a RAN (Random Access Memory), and is used for, for example, temporary storage of data necessary for the CPU 621 to execute the control program, and image data.

The network I/F 603 communicates with external devices (including the communication terminal 403) via a network in accordance with an instruction of the system controller 601. The network I/F 603 is used for, for example, communication in compliance with a standard such as Bluetooth (registered trademark). Communication between the network I/F 603 and an external device is performed in, for example, a wireless LAN (Local Area Network). One example of the network I/F 603 is an interface of a wired LAN mainly used for communication with a server and/or a PC (personal computer). Another example of the network I/F 603 is an interface of a wireless LAN (for example, a communication network in compliance with the IEEE 802.11 standard) mainly used for communication with a mobile terminal and/or a PC.

The printer engine 604 performs a printing process on a sheet and the like based on print data processed by the output image processing unit 605. Especially, when the MFP 100 operates as a printer, the printer engine 604 prints an image. When the MFP 100 operates as a copier, the printer engine 604 prints an image read by the imaging unit 607.

For example, upon printing of an image, the output image processing unit 605 executes a conversion process for converting a data format of the image to a data format for printing.

The storage device 606 is, for example, an HDD (Hard Disk Drive). Various kinds of data related to the operation of the MFP 100, and the like are stored in the storage device 606. Furthermore, image data of screens to be displayed on the operation panel 300 of the MFP 100 may be stored in the storage device 606.

The imaging unit 607 reads an image of an original and outputs it to the input image processing unit 608.

In, for example, a case where the imaging unit 607 reads an image, the input image processing unit 608 performs a conversion process of converting to a format of the image data.

In the MFP 100, the CPU 621 executes an appropriate program to implement such operation of the MFP 100 described in the specification. Programs to be executed by the CPU 621 may be stored in the ROM 622 as described above, may be stored in the storage device 606, or may be stored in a storage medium detachable from the MFP 100. The storage medium in which the programs are stored is a medium in which data is stored in a nonvolatile manner, such as a CD-ROM (Compact Disc-Read Only Memory), a DVD-ROM (Digital Versatile Disk-Read Only Memory), a USB (Universal Serial Bus) memory, a memory card, an FD (Flexible Disk), a hard disk, an SSD (Solid State Drive), a magnetic tape, a cassette tape, an MO (Magnetic Optical Disc), an MD (Mini Disc), an IC (Integrated Circuit) card (excluding a memory card), an optical card, a mask ROM, an EPROM, and an EEPROM (Electronically Erasable Programmable Read-Only Memory).

The program according to the present disclosure may be one that calls a necessary module in a predetermined array at a predetermined timing from program modules provided as part of an operating system (OS) of a computer and executes a process. In this case, the program itself does not include the modules. The process is executed in cooperation with the OS. Such a program without modules can be included in the program according to the present disclosure.

The program according to the present disclosure may be provided incorporated in part of another program. Also in this case, the program itself does not include modules included in the other program. A process is executed in cooperation with the other program. Such a program incorporated in another program can also be included in the program according to the present disclosure.

A program product to be provided is installed in a program storage unit such as a hard disk to be executed. The program product includes the program itself and a recording medium in which the program is recorded.

<6. Configuration of Operation Panel>

Figure 6:
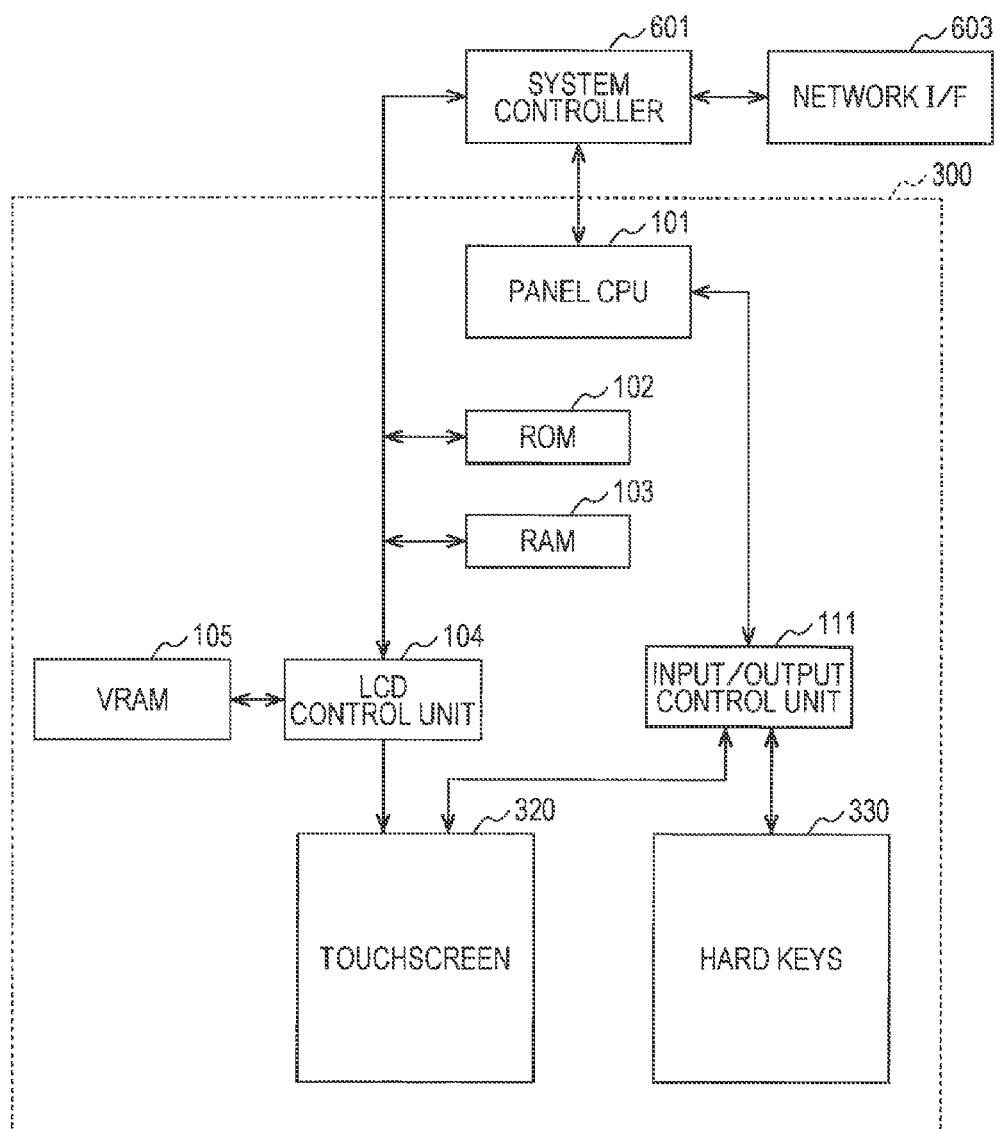
FIG. 6 is a block diagram illustrating the configuration of the operation panel of the MFP.

FIG. 6 is a block diagram illustrating the configuration of the operation panel 300 of the MFP 100. The operation panel 300 includes a panel CPU 101, a ROM 102, a RAM 103, an LCD (Liquid Crystal Display) control unit 104, a VRAM (Video RAM) 105, and an input/output control unit 111, in addition to the touchscreen 320 and the hard keys 330, which are described with reference to FIG. 4 and the like.

The panel CPU 101 controls the entire operation panel 300, and communicates with the system controller 601 (see FIG. 5) on the main body side of the MFP 100.

A program for controlling the operation of the operation panel 300, and images to be displayed on the touchscreen 320 are stored in the ROM 102. The RAM 103 is work memory of the panel CPU 101.

The LCD control unit 104 controls the display of a display (for example, a liquid crystal display device) included in the touchscreen 320. The LCD control unit 104 controls read and write of the VRAM 105. An image stored in the ROM 102 is stored by the panel CPU 101 in the VRAM 105 via the LCD control unit 104, and then read out to be output to the touchscreen 320.

The touchscreen 320 includes the display and a touch sensor. The touchscreen 320 identifies a touch position (or a position at which a conductor has been brought into intimate contact) on the touch sensor, and outputs the identified position to the input/output control unit 111.

The input/output control unit 111 identifies an item (such as a menu or a function) selected by a touch operation based on display contents on the display and the touch position output from the touchscreen 320, and outputs the item to the panel CPU 101. The input/output control unit 111 can also be realized as one function of the same processor as a processor configuring the panel CPU 101.

The hard keys 330 include various keys such as a start key, numeric keys, and a panel reset key.

The operation panel 300 may include various elements such as an LED (Light Emitting Diode) that indicates the status of the MFP 100 and a buzzer for notification or the like, in addition to the above elements.

Input operations on the hard keys 330 and the touchscreen 320 are transmitted to the system controller 601 via the input/output control unit 111 and the panel CPU 101 if necessary. Consequently, the main body of the MFP 100 operates based on the input operation on the operation panel 300. For example, when the start key of the hard keys 330 is pressed, information indicating that the start key has been pressed is communicated to the system controller 601 of the main body of the MFP 100 via the hard key 330, the input/output control unit 111, and the panel CPU 101 to start a series of copy operations.

<7. Configuration of Communication Terminal>

Figure 7:
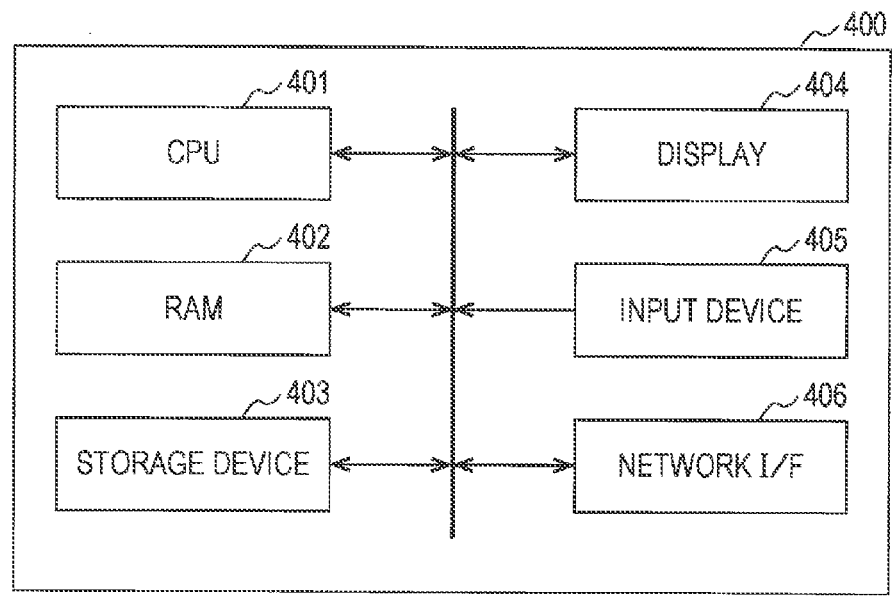
FIG. 7 is a block diagram illustrating the hardware configuration of the communication terminal.

FIG. 7 is a block diagram illustrating the hardware configuration of the communication terminal 400. As illustrated in FIG. 7, the communication terminal 400 includes, as main constituent elements, the CPU 401, a RAM 402, the storage device 403, a display 404, an input device 405, and a network I/F 406. The CPU 401, the RAM 402, the storage device 403, the display 404, the input device 405, and the network I/F 406 are connected to each other by an internal bus.

The CPU 401 is an example of an arithmetic unit that executes a process for controlling the entire operation of the communication terminal 400.

The RAM 402 functions as a work area upon execution of a process of the CPU 401.

Data of various programs such as an OS (Operating System) program or an application program that is executed by the CPU 401, and data used to execute these programs are saved in the storage device 403. Examples of the storage device 403 include a medium in which data is stored in a nonvolatile manner, such as an EEPROM. A program downloaded via a network may be installed in the storage device 403. The CPU 401 may execute a program recorded in a recording medium detachable from a main body of the communication terminal 400 and/or a program recorded in a storage medium on the network to implement a function described in the specification.

The display 404 is a display device for displaying an image illustrating the process result of a program executed by the CPU 401.

The input device 405 is an example of an input device for inputting information into the communication terminal 400, such as the input of an instruction on the process of an application being executed. Another example of an input device included in the communication terminal 400 is a touch sensor provided on the display 404.

The network I/F 406 communicates with an external device such as the MFP 100 in compliance with a standard such as Bluetooth.

<8. Functional Configurations>

Figure 8:
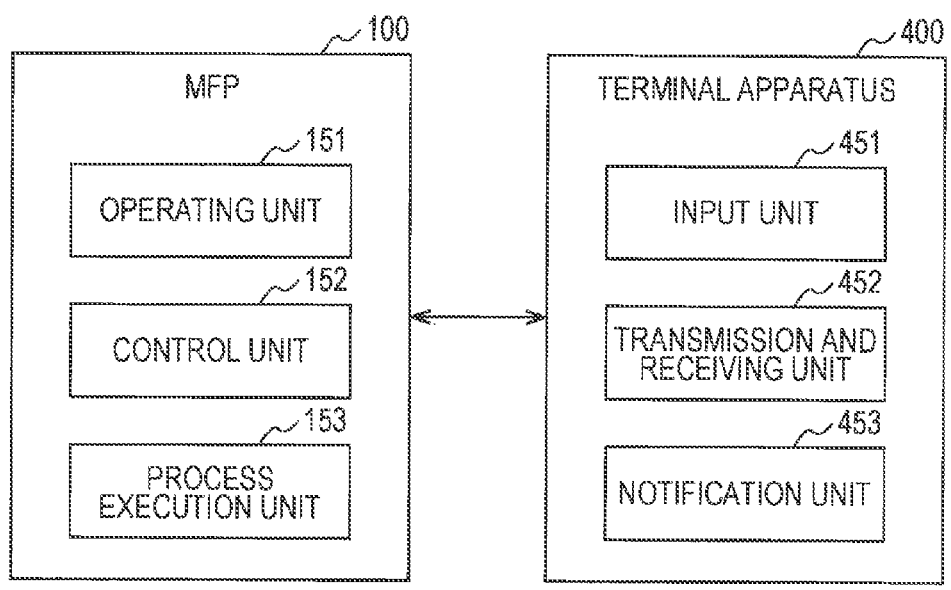
FIG. 8 is a diagram illustrating the functional configurations of the MFP and the communication terminal according to the first example.

FIG. 8 is a diagram illustrating the functional configurations of the MFP 100 and the communication terminal 400 according to the first example.

As illustrated in FIG. 8, the MFP 100 includes an operating unit 151, a control unit 152, and a process execution unit 153. The operating unit 151 includes the operation panel 300 (FIG. 5 and the like), and accepts an information input operation of the user. The control unit 152 includes the panel CPU 101 and controls the operation of the operating unit 151.

The communication terminal 400 includes an input unit 451, a transmission and receiving unit 452, and a notification unit 453. The input unit 451 includes the input device 405 (FIG. 7 and the like) and accepts the input of various kinds of information such as information input into the information input field 413. The transmission and receiving unit 452 includes the network I/F 406, and transmits and receives information to and from an external device such as the MFP 100. The notification unit 453 includes the CPU 401 and executes operations including notification to the MFP 100.

<9. Flow of Process>

Figure 9:
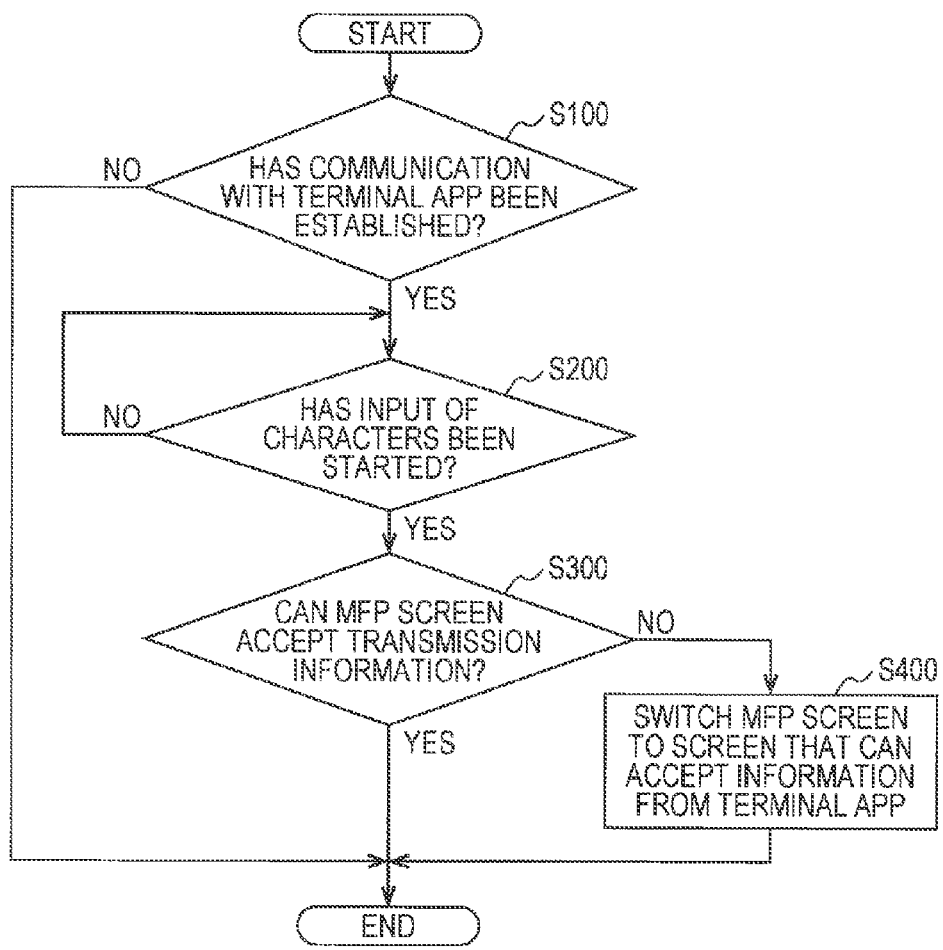
FIG. 9 is a flowchart of an example of a process to be executed in the MFP.

FIG. 9 is a flowchart of an example of a process to be executed in the MFP 100. The process of FIG. 9 is executed by, for example, the system controller 601.

As illustrated in FIG. 9, in step S100, the system controller 601 determines whether a communication in accordance with a request of the app of the communication terminal 400 ("TERMINAL APP" in FIG. 9 the application for displaying the window including the information input field 413) has been established. If it has been determined that the communication has not been established, the process of FIG. 9 ends.

On the other hand, if it has been determined that the communication has been established, the control proceeds to step S200.

In step S200, the system controller 601 determines whether the input of characters has been started in the app. When the input of information into the information input field 413 (FIG. 1) has been started in the communication terminal 400, the app notifies the input of the information to the MFP 100. In step S200, the system controller 601 determines whether to have received the notification from the app. The control remains in step S200 until the receipt of the notification. When the notification has been received, the control proceeds to step S300.

In step S300, the system controller 601 determines whether the operation panel 300 is in the status that can accept the input of the information input in the information input field 413. More specifically, the system controller 601 determines whether the screen displayed on the touchscreen 320 is a screen like the screen 520 of FIG. 1. If having determined that the information can be input (a screen like the screen 520 is being displayed), the system controller 601 ends the process of FIG. 9. On the other hand, if having determined that the information cannot be input (the screen being displayed is not a screen like the screen 520), the system controller 601 advances the control to step S400.

In this example, according to step S300, the system controller 601 determines whether the operating unit (the operation panel 300) of the image forming apparatus is in a status that accepts an information input operation based on whether the display screen of the operation panel 300 is the screen that accepts the input of the information input into the information input field 413.

The system controller 601 may inquire of the panel CPU 101 about the status of the touchscreen 320 to execute the determination of step S300.

In step S400, the system controller 601 switches the display of the touchscreen 320 to the screen that can accept the input of the information from the communication terminal 400 (for example, the screen 520 of FIG. 1) and ends the process of FIG. 9.

When the send button 414 (FIG. 1) is operated afterward, the communication terminal 400 transmits the information input in the information input field 413 to the MFP 100. In response to this, the system controller 601 receives the information to pass it to the panel CPU 101. When having received the information, panel CPU 101 inputs the information on the screen being displayed on the touchscreen 320 (for example, the input field 522 of the screen 521).

As described above, when having accepted, in the information input field 413, the input of the information to be input into the input field 522 of the MFP 100, the app on the communication terminal 400 notifies it to the MFP 100. The notification may be issued in response to the start of the input into the information input field 413, may be issued in response to the input of characters equal to or greater than a predetermined number in the information input field 413, or may be issued in response to the lapse of a predetermined time since the start of input into the information input field 413.

In response to the notification from the communication terminal 400, the MFP 100 determines whether the touchscreen 320 is displaying the screen that accepts the input of the information. If the touchscreen 320 is not displaying such a screen that accepts the input of the information, the MFP 100 switches the status of the touchscreen 320 to a status that displays such a screen.

In an image forming system according to a second example, each of the MFP 100 and the communication terminal 400 includes a user authentication function. When having received the notification from the communication terminal 400, the MFP 100 switches the display screen of the touchscreen 320 on condition that the user operating the communication terminal 400 is the same as a user who has logged in to the MFP 100.

Figure 10:
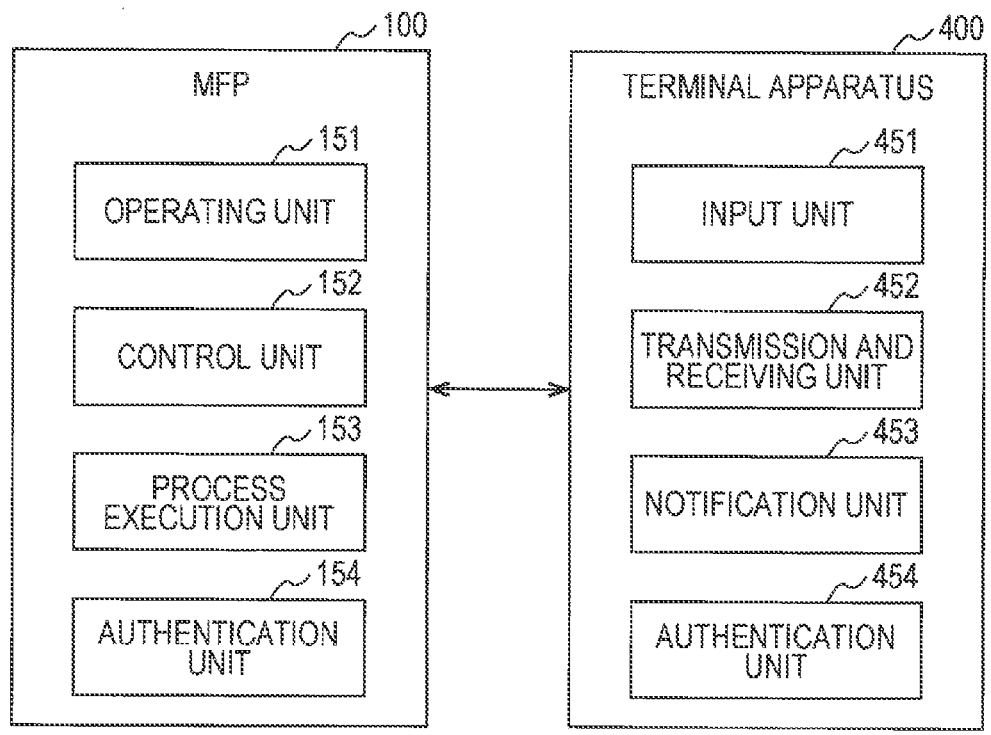
FIG. 10 is a diagram illustrating the functional configurations of an MFP and a communication terminal according to a second example.

FIG. 10 is a diagram illustrating the functional configurations of the MFP 100 and the communication terminal 400 according to the second example.

As compared to FIG. 8, the MFP 100 further includes an authentication unit 154 for authenticating a user who logs in to the MFP 100. For example, the system controller 601 executes a user authentication process to realize the authentication unit 154.

The communication terminal 400 further includes an authentication unit 454 for authenticating a user who logs in to the communication terminal 400. For example, the CPU 401 executes a user authentication process to realize the authentication unit 454.

Figure 11:
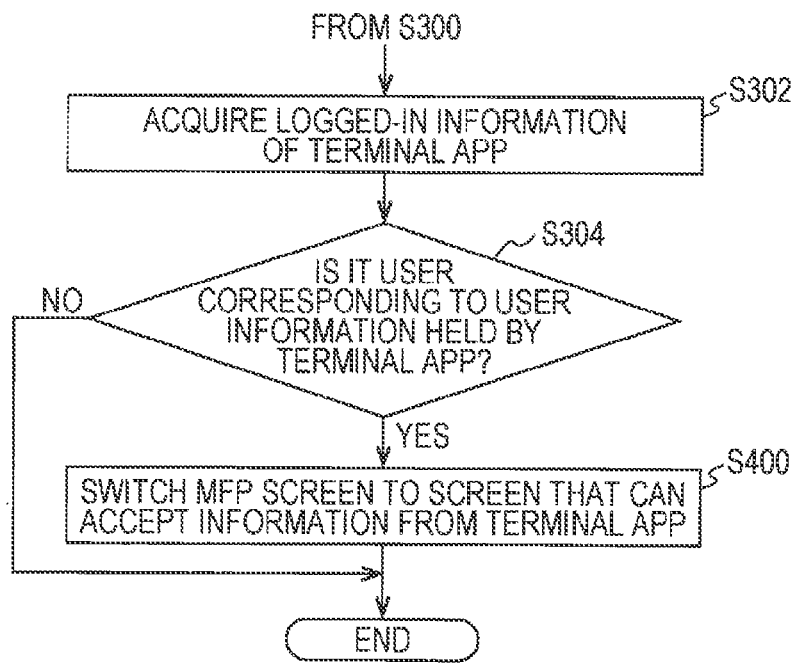
FIG. 11 is a flowchart illustrating a part of a process to be executed in the MFP.

FIG. 11 is a flowchart illustrating a part of a process to be executed in the MFP 100.

In step S300 of FIG. 9 of the first example, if the system controller 601 determines that the operation panel 300 is in the status that does not accept the input of the information input in the information input field 413, the control proceeds to step S302 of FIG. 11.

In step S302, the system controller 601 acquires information that identifies a logged-in user of the communication terminal 400 from the app on the communication terminal 400. The control proceeds to step S304.

In step S304, the system controller 601 determines whether the logged-in user of the communication terminal 400 acquired in step S302 is the same as a user who has logged in to the MFP 100. If having determined that both users are the same, the system controller 601 advances the control to step S400. On the other hand, if having determined that both users are different, the system controller 601 ends the process of FIG. 11 without any further processing.

In step S400, the system controller 601 switches the display of the touchscreen 320 to the screen that can accept the input of the information from the communication terminal 400, and ends the process of FIG. 11.

As described above, the MFP 100 switches the display of the touchscreen 320 on condition that the logged-in user of the communication terminal 400 and the logged-in user of the MFP 100 are the same. On the other hand, if both users are different, the switching of the screen described with reference to FIG. 1 is not performed. Consequently, the user who is different from the user operating the communication terminal 400 operates the MFP 100. Consequently, the switching of the screen of the MFP 100 can be avoided when it is not preferable to switch the display screen of the MFP 100 by an operation on the communication terminal 400.

In a third embodiment, if an operation on the operation panel 300 is performed after a connection to the communication terminal 400 is established, the MFP 100 notifies it to the communication terminal 400. When having received the notification, the app on the communication terminal 400 does not issue a notification in response to the input into the information input field 413 ("INPUT-IN-PROGRESS NOTIFICATION" of FIG. 2).

Figure 12:
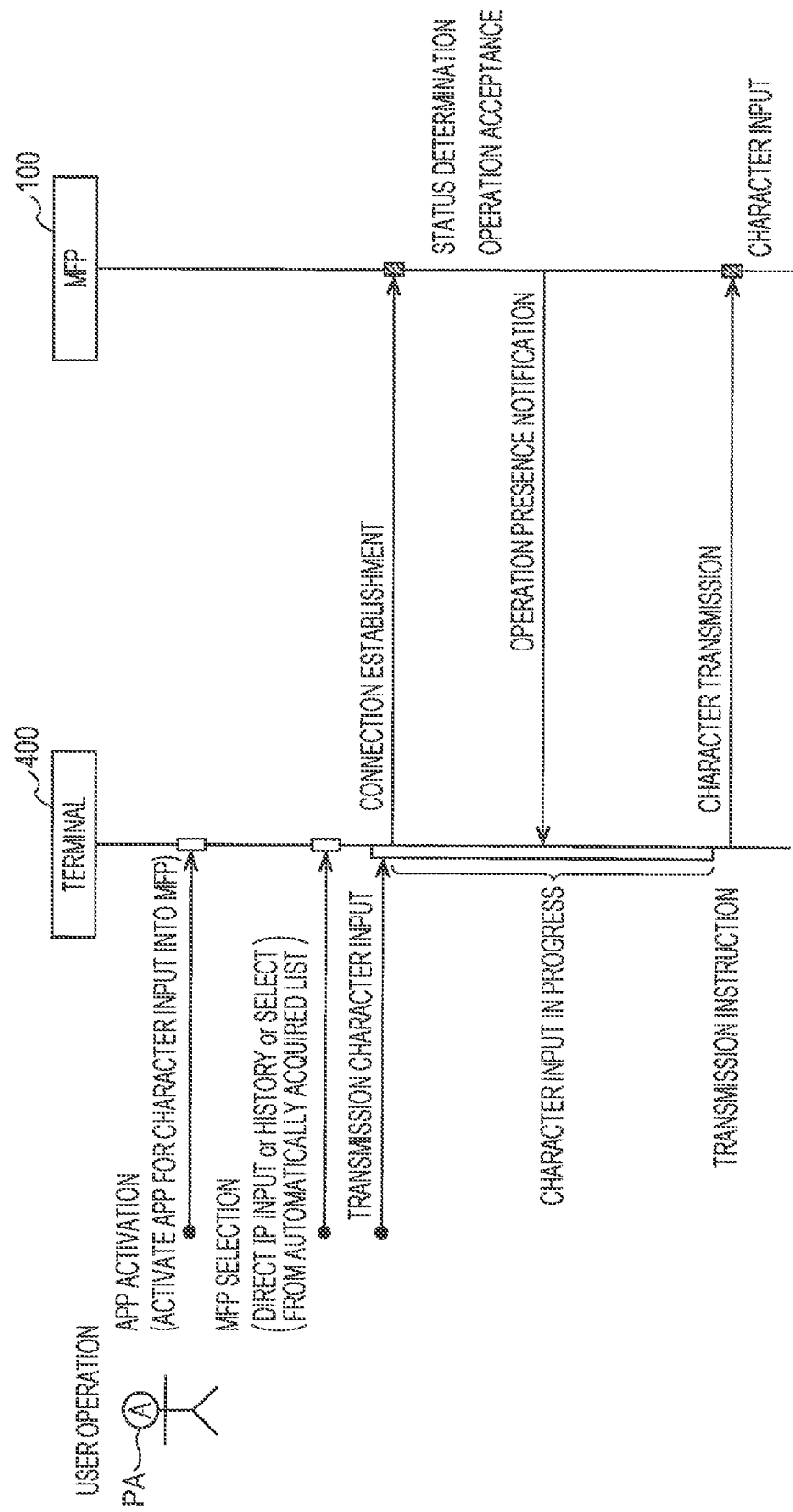
FIG. 12 is a diagram illustrating an overview of a process to be executed between a communication terminal and an MFP in an image forming system according to a third example.

FIG. 12 is a diagram illustrating an overview of a process to be executed between the communication terminal 400 and the MFP 100 in an image forming system according to the third example. As illustrated in FIG. 12, after a communication between the communication terminal 400 and the MFP 100 is established ("CONNECTION ESTABLISHMENT" in FIG. 12), the MFP 100 determines whether an operation is performed on the operation panel 300. "Operation" in this case includes an operation on the touchscreen 320 and an operation on the hard key 330. If having subsequently determined that there has been an operation on the operation panel 300 ("OPERATION ACCEPTANCE" in FIG. 12), the MFP 100 notifies it to the communication terminal 400 ("OPERATION PRESENCE NOTIFICATION" in FIG. 12). The "operation presence notification" is an example of a notification that the operating unit (the operation panel 300) is accepting input in the embodiment.

When having received the "operation presence notification," the app on the communication terminal 400 continues accepting the input into the information input field 413 but does not issue the "input-in-progress notification" in FIG. 2.

When having accepted an operation on the send button 414 afterward ("TRANSMISSION INSTRUCTION" in FIG. 12), the app on the communication terminal 400 transmits the information input in the information input field 413 to the MFP 100 ("CHARACTER TRANSMISSION" in FIG. 12).

When having received the information by "character transmission," the MFP 100 accepts the input of the information if the screen being displayed on the touchscreen 320 is the screen that accepts the input of the information (for example, the screen 520 of FIG. 1). On the other hand, if the screen being displayed on the touchscreen 320 is the screen that does not accept the input of the information (for example, the screen 510 of FIG. 1), the MFP 100 discards the information.

Figure 13:
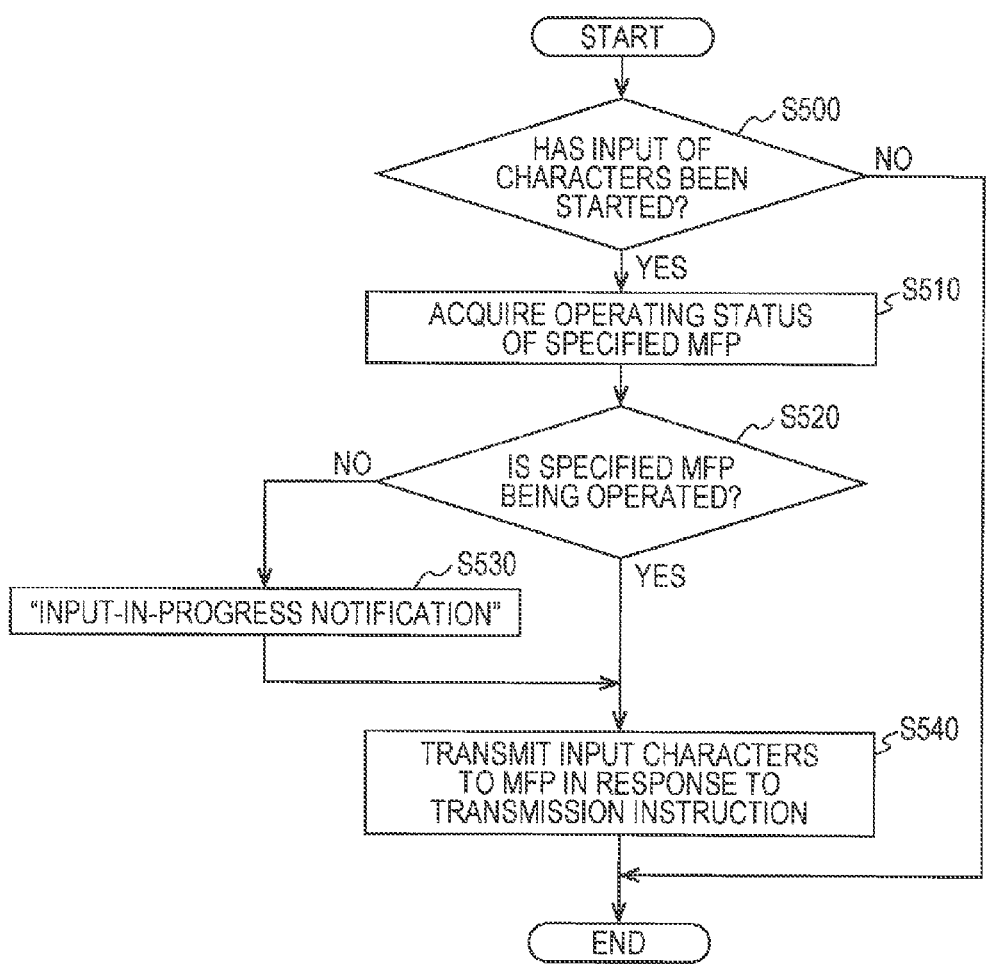
FIG. 13 is a flowchart of a process to be executed by an app of the communication terminal according to the third example.

FIG. 13 is a flowchart of a process to be executed by the app (the CPU 401) of the communication terminal 400 according to the third example. As illustrated in FIG. 13, in step S500, the app determines whether the input of characters into the information input field 413 (FIG. 1) has been started. If it has been determined that the input has not yet been started, the process of FIG. 13 ends. On the other hand, if it has been determined that the input has been started, the control proceeds to step S510.

In step S510, the app acquires the operating status of the MPF 100 specified in the address input field 412 (FIG. 1). More specifically, the app identifies the status of the MFP 100 based, for example, on whether to have received the "operation presence notification" of FIG. 12 from the MFP 100. If the "operation presence notification" has been received, it is identified that the MFP 100 is being operated. If the "operation presence notification" has not been received, it is identified that the MFP 100 is not being operated. The control then proceeds to step S520.

In step S520, the app determines whether the statue of the MFP 100 acquired in step S510 is during operation. If it has been determined that the status is during operation, the control proceeds to step S540. On the other hand, if it has been determined that the status is not during operation, the control proceeds to step S530.

Step S520 is executed at a specific timing after the start of the input of the information into the information input field 413 is detected. An example of the specific timing is immediately after the start of the input. Another example is after the lapse of a certain period of time since the start of the input. Still another example is at the time when the input of a specific amount of information is complete during the input. For example, if the information input field 413 accents the input of a 12-digit IP address, the input of the specific amount of information indicates that the input of up to the ninth digit is completed. Still another example is at the time when specific information is input. For example, if the information input field 413 accepts the input of an email address, the specific information is a character "@" located in the middle of the email address.

In step S530, the app notifies the "input-in-progress notification" (FIG. 2) to the MFP 100. The control then proceeds to step S540.

In step S540, the app accepts an operation on the send button 414 and, if there is the operation, transmits the information input in the information input field 413 to the MFP 100. Consequently, the process of FIG. 13 ends.

As described above, when information is input into the information input field 413 in the communication terminal 400, if the MFP 100 accepts an operation on the operation panel 300, the communication terminal 400 does not issue the "input-in-progress notification." That the MFP 100 has accepted the operation on the operation panel 300 during the input of the information into the information input field 413 may include a possibility that the MFP 100 is being operated by a user who is different from the user of the communication terminal 400. Therefore, it is possible to avoid an event where the display screen of the MFP 100 is switched if there is the possibility that the MFP 100 is being operated by a user who is different from the user of the communication terminal 400.

When the send button 414 is operated from the communication terminal 400 to the MFP 100, if the display screen of the MFP 100 is a screen where the information input in the information input field 413 can be input, the information is input into the MFP 100.

Figure 14:
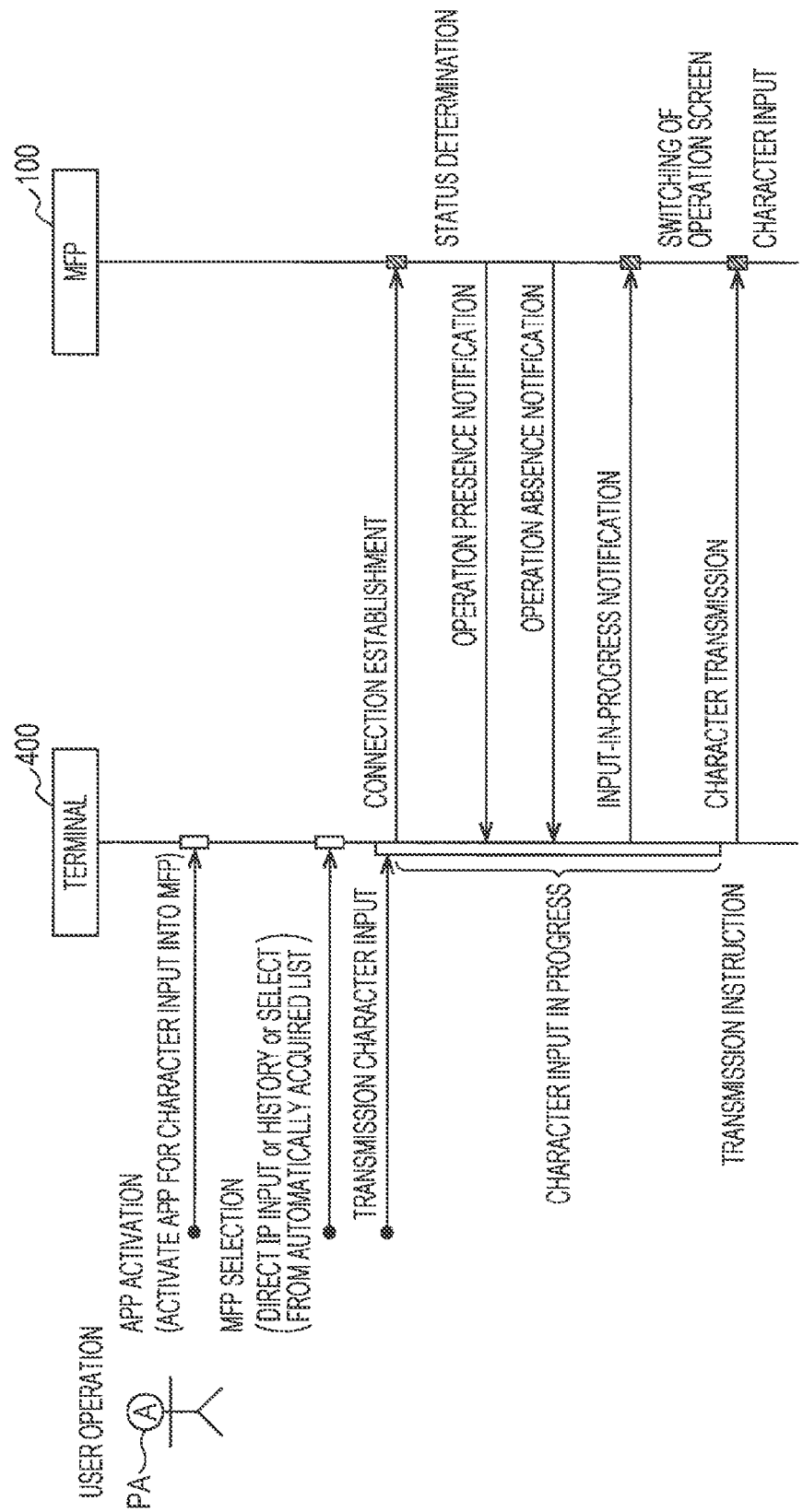
FIG. 14 is a diagram illustrating an overview of a process to be executed between a communication terminal and an MFP in an image forming system according to a fourth example.

The MFP 100 according to a fourth example further notifies that the operation panel 300 is no longer being operated as compared to the MFP 100 according to the third example, FIG. 14 is a diagram illustrating an overview of a process to be executed between the communication terminal 400 and the MFP 100 in an image forming system according to the fourth example.

As illustrated, in FIG. 14, if after a connection to the communication terminal 400 is established, the MFP 100 issues the "operation presence notification" and then a state where the operation panel 300 is not operated continues for a certain period of time (for example, one minute), the MFP 100 notifies that there is no operation on the operation panel 300 ("OPERATION ABSENCE, NOTIFICATION" in FIG. 14). In the embodiment, the "operation absence notification" is an example of the notification that the operating unit (the operation panel 300) is not accepting input.

The communication terminal 400 issues the "operation-in-progress notification" to the MFP 100 in response to the receipt of the "operation absence notification,". In response to this, if the display screen of the touchscreen 320 is the screen that does not accept the input of the information input in the information input field 413, the MFP 100 switches the display screen of the touchscreen 320 to the one that accepts the input of the information. ("SWITCHING OF OPERATION SCREEN" in FIG. 14).

Figure 15:
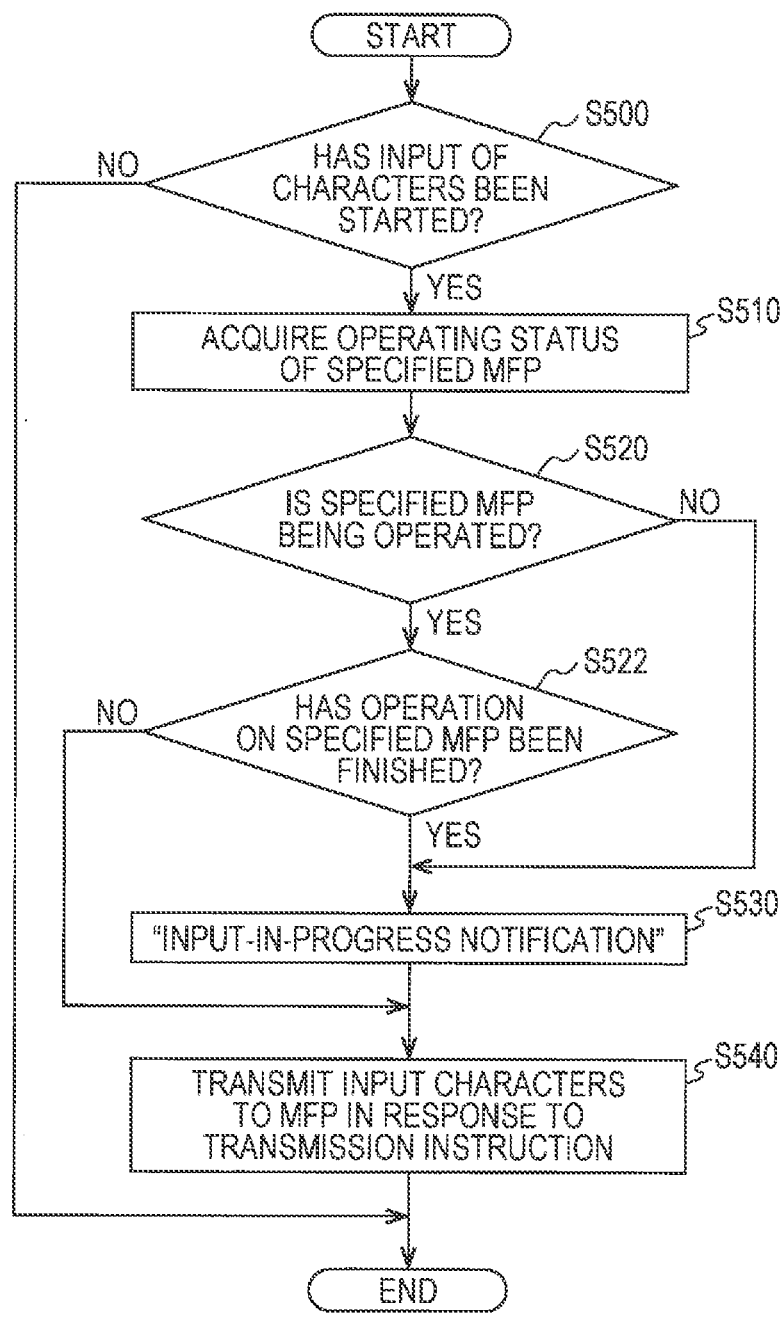
FIG. 15 is a flowchart of a process to be executed by an app of the communication terminal according to the forth embodiment.

FIG. 15 is a flowchart of a process to be executed by an app (the CPU 401) of the communication terminal 400 according to the forth embodiment. In the process of FIG. 15, if it has been determined in step S520 that the MFP 100 is being operated, the control proceeds to step S522.

In step S522, the app determines whether the operation on the operation panel 300 of the MFP 100 has been finished. If receiving the "operation absence notification" of FIG. 14, for example, before the lapse of a predetermined time (for example, two minutes) since the execution of step S520, the app determines that the operation on the operation panel 300 has been finished. If not having received the "operation absence notification" of FIG. 14 before the lapse of the predetermined time (for example, two minutes) since the execution of step S520, the app determines that the operation on the operation panel 300 has not been finished. If it has been determined in step S522 that the operation on the operation panel 300 of the MFP 100 has been finished, the control proceeds to step S530. If it has been determined in step S522 that the operation on the operation panel 300 of the MFP 100 has not been finished, the control proceeds to step S540.

In step S530, the app issues the "input-in-progress notification" to the MFP 100. The control then proceeds to step S540.

In step S540, the app transmits the information input in the information input field 413 to the MFP 100 in response to an operation on the send button 414.

As described above, when another user's operation on the MFP 100 is finished, the screen is switched in the MFP 100. Also when the user of the communication terminal 400 operates the MFP 100 while operating the communication terminal 400, in other words, also when the "operation presence notification" is issued by the operation by the user of the communication terminal 400, the screen can be switched in the MFP 100.

In a fifth example, when the screen of the touchscreen 320 is switched in the MFP 100 in response to the "input-in-progress notification" (FIG. 2 and the like) from the communication terminal 400, the MFP 100 decides to which screen the display of the touchscreen 320 is switched, in accordance with the type of information transmitted from the communication terminal 400. The type of information may be identified by the app of the communication terminal 400, or may be identified by the MFP 100.

Figure 16:
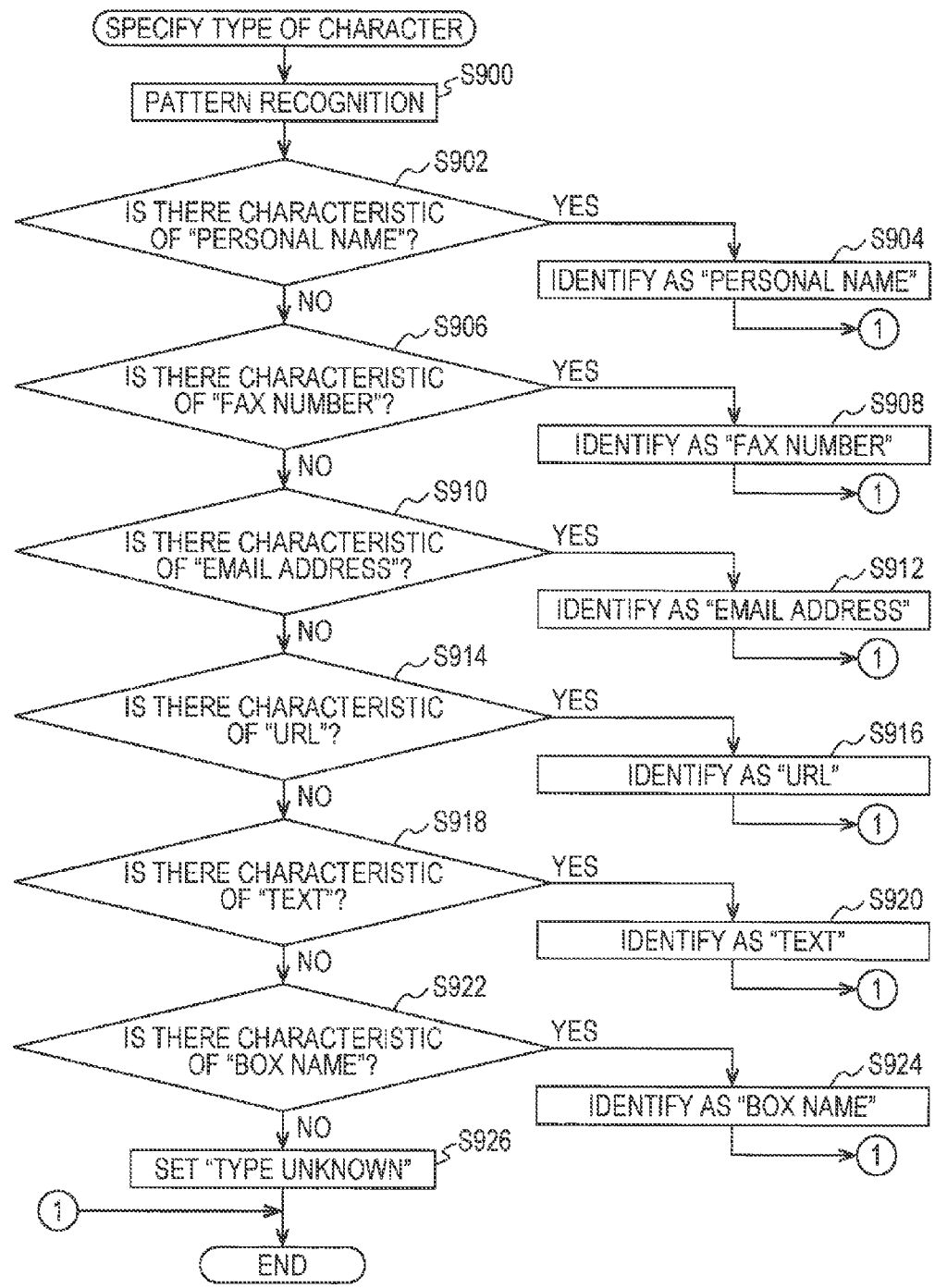
FIG. 16 is a flowchart of an example of a process for identifying the type of information input by pattern recognition according to a fifth example.

Prior to the decision about a screen to be switched, the type of the information input in the information input field 413 is identified. The type may be identified by the app on the communication terminal 400 accepting the input of information, for identifying the type, or may be identified by pattern recognition of the input information. FIG. 16 is a flowchart of an example of a process for identifying the type of input information by pattern recognition.

In step S900, the app executes pattern recognition on the characters input in the information input field 413. The control then proceeds to step S902.

In step S902, the app determines whether the characters input in the information input field 413 has a characteristic of a "personal name" as a result of the pattern recognition of step S900. The app advances the control to the step S904, for example, if a first predetermined number of characters input in the information input field 413 match a predetermined number of characters of one or more groups of character strings registered as personal names. In this case, the predetermined number of characters input in the information input field 413 has the characteristic of a "personal name." For example, if characters "suzuki" are input into the information input field 413, and a character string "suzuki" is registered as a "personal name," the input characters "suzuki" match the registered character string "suzuki" so that the input characters "suzuki" are determined to have the characteristic of a "personal name."

On the other hand, the app advances the control to step S906 if the predetermined number of characters input in the information input field 413 do not match any of the one or more groups of character strings registered as personal names. In this case, the predetermined number of characters input in the information input field 413 does not have the characteristic of a "personal name."

In step S904, the app identifies the information input in the information input field 413 as a "personal name," notifies it to the MFP 100, and ends the process of FIG. 16.

In step S906, the app determines whether the predetermined number of characters has a characteristic of a "fax number" as a result of the pattern recognition of step S900. The app advances the control to step S908, for example, if the character string input in the information input field 413 has the characteristic of a fax number (for example, the character string is a character string including only numerals, and the first character is "0"). On the other hand, the app advances the control to step S910 if the predetermined number of characters input in the information input field 413 do not have the characteristic of a fax number.

In step S908, the app identifies that the information input in the information input field 413 as a "fax number," notifies it to the MFP 100, and ends the process of FIG. 16.

In step S910, the app determines whether the predetermined number of characters have a characteristic of an "email address" as a result of the pattern recognition of step S900. The app advances the control to step S912, for example, if the character string input in the information input field 413 has the characteristic of an email address (for example, the character string includes the character "@" at the second character or later). On the other hand, the app advances the control to step S914 if the predetermined number of characters input in the information input field 413 do not have the character of an email address.

In step S912, the app identifies the information input in the information input field 413 as an "email address," notifies it to the MFP 100, and ends the process of FIG. 13.

In step S914, the app determines whether the predetermined number of characters have a characteristic of a "URL" as a result of the pattern recognition of step S900. The app advances the control to step S916, for example, if the character string input in the information input field 413 has the characteristic of a URL (for example, the character string begins with a character string "http/" or a character string "FTP://")/. On the other hand, the app advances the control to step S918 if the predetermined number of characters input in the information input field 413 do not have the characteristic of a URL.

In step S916, the app identifies the information input in the information input field 413 as a "URL," notifies it to the MFP 100, and ends the process of FIG. 16.

In step S918, the app determines whether the predetermined number of characters have a characteristic of text as a result of the pattern recognition of step S900. The app advances the control to step S920, for example, if the character string input in the information input field 413 has the characteristic of text (for example, the character string begins with a specific character string "I hope this email finds you well"). On the other hand, the app advances the control to step S922 if the predetermined number of characters input in the information input field 413 do not have the characteristic of text.

In step S920, the app identifies the information input in the information input field 413 as "text," notifies it to the MFP 100, and ends the process of FIG. 16.

In step S918, the app determines whether the predetermined number of characters have a characteristic of a "box name" as a result of the pattern recognition of step S900. "Box name" is a name that identifies each of one or more storage areas for file storage set in the storage device 606 of the MFP 100. The app advances the control to step S920, for example, if the character string input in the information input field 413 has the characteristic of a box name (for example, the character string begins with the same character string as any of one or more character strings registered as box names.). In step S918, box names in the MFP 100 may be stored in advance in the storage device 403. Alternatively, the app may inquire of the MFP 100 about a list of box names in step S918.

On the other hand, the app advances the control to step S922 if the predetermined number of characters input in the information input field 413 do not have the characteristic of a box name.

In step S918, for example, if the box names in the MFP 100 include a box name "ichiyama_box," when a character string "ichiyama_" is input into the information input field 413, the app determines that the input character string has the characteristic of a box name.

In step S920, the app identifies the information input in the information input field 413 as a "box name," notifies it to the MFP 100, and ends the process of FIG. 16.

In step S922, the app determines whether the predetermined number of characters have the characteristic of a "box name" as a result of the pattern recognition of step S900, "Box name" is a name that identifies each of one or more storage areas for file storage set in the storage device 606 of the MFP 100. The app advances the control to step S924, for example, if the character string input in the information input field 413 has the characteristic of a box name (for example, the character string begins with the same character string as any of the one or more character strings registered as box names) In step S922, the box names in the MFP 100 may be stored in advance in the storage device 403. Alternatively, the app may inquire of the MFP 100 about the list of box names in stem S918.

On the other hand, the app advances the control to step S926 if the predetermined number of characters input in the information input field 413 do not have the characteristic of a box name.

In step S922, for example, if the box names in the MFP 100 include the box name "ichiyama_box," when, the character string "ichiyama_" is input into the information input field 413, the app determines that the input character string has the characteristic of a box name.

In step S924, the app identifies the information input in the information input field 413 as a "box name," notifies it to the MFP 100, and ends the process of FIG. 16.

In step S926, the app notifies the MFP 100 that the type of the information input in the information input field 413 was not able to be identified, and ends the process of FIG. 16.

If the type of information is identified in the MFP 100 as illustrated in FIG. 16, the communication terminal 400 transmits the information input in the information input field 413 to the MET 100 prior to the operation on the send button 414 (FIG. 1). The system controller 601 of the MFP 100 uses the information input in the information input field 413, which has been transmitted from the communication terminal 400, to execute the process of FIG. 16.

Figure 19:
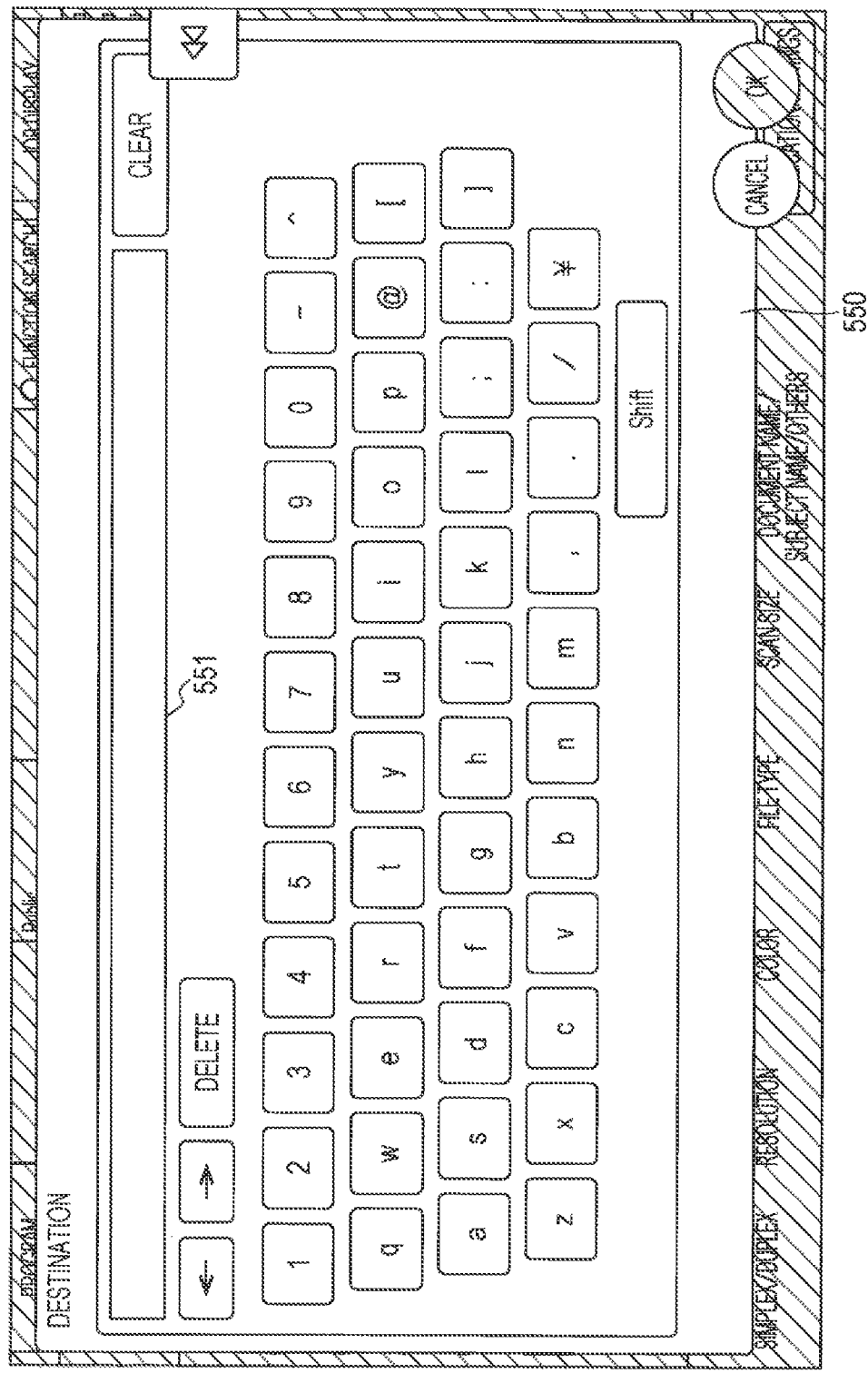
FIG. 19 is an example of a screen corresponding to a type "email address"

Next, a description is given of specific examples of screens in accordance with the types of the information input in the information input field 413. FIG. 17 is an example of a screen corresponding to the type "personal name," 18 is an example of a screen corresponding to the type "fax number," FIG. 19 is an example of a screen corresponding to the type "email address." FIG. 20 to are examples of screens corresponding to the type "URL," respectively. FIG. 23 is an example of a screen corresponding to the type "text." FIG.

24 is an example of a screen corresponding to the type "box name." Each screen is described below.

A screen 530 of FIG. 17 is an example of a screen for registering a new user in an address book in the MFP 100. The screen 530 includes an input field 531 that displays an input user name.

If the type of the information input in the information input field 413 is identified as a "personal name," the touchscreen 320 displays the screen 530 in the "switching of the operation screen" of FIG. 2. The information transmitted from the communication terminal 400 by the operation on the send button 414 is then input into the input field 531.

Figure 18:
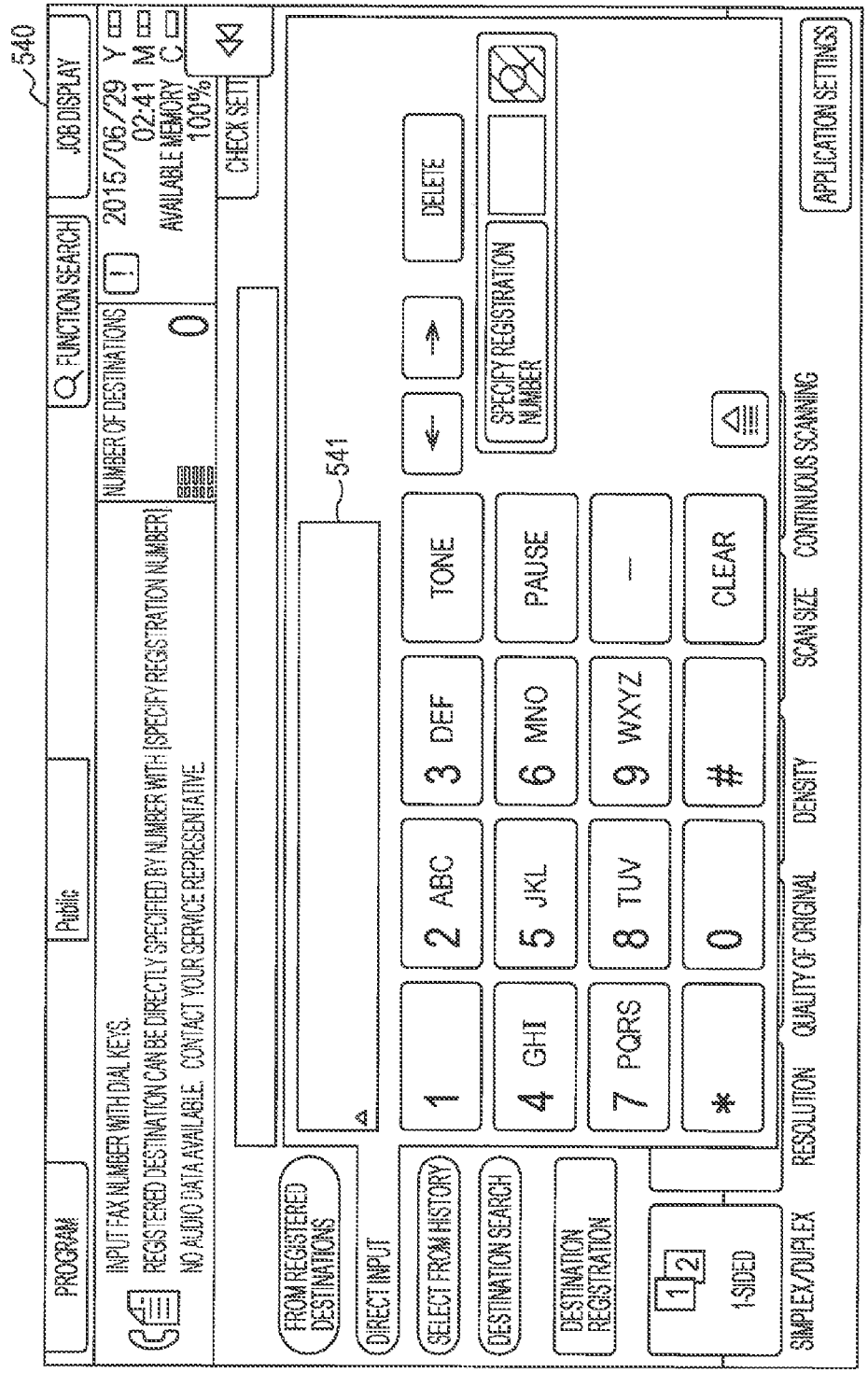
FIG. 18 is an example of a screen corresponding to a type "fax number"

A screen 540 of FIG. 18 is a screen for inputting a transmission destination when the MFP 100 transmits data by facsimile communication. The screen 540 includes an input field 541 that displays an input fax number.

If the type of the information input in the information input field 413 is identified as a "fax number," the touchscreen 320 displays the screen 540 in the "switching of the operation screen" of FIG. 2. The information transmitted from the communication terminal 400 by the operation, on the send button 414 is then input into the input field 541.

A screen 550 of FIG. 19 is a screen for inputting an email address of a transmission destination when the MFP 100 transmits information by electronic mail. The screen 550 includes an, input field 551 for displaying an input email address.

If the type of the information input in the information input field 413 is identified as an "email address," the touchscreen 320 displays the screen 550 in the "switching of the operation screen" of FIG. 2. The information transmitted from the communication terminal 400 by the operation on the send button 414 is then input into the input field 551.

Figure 20:
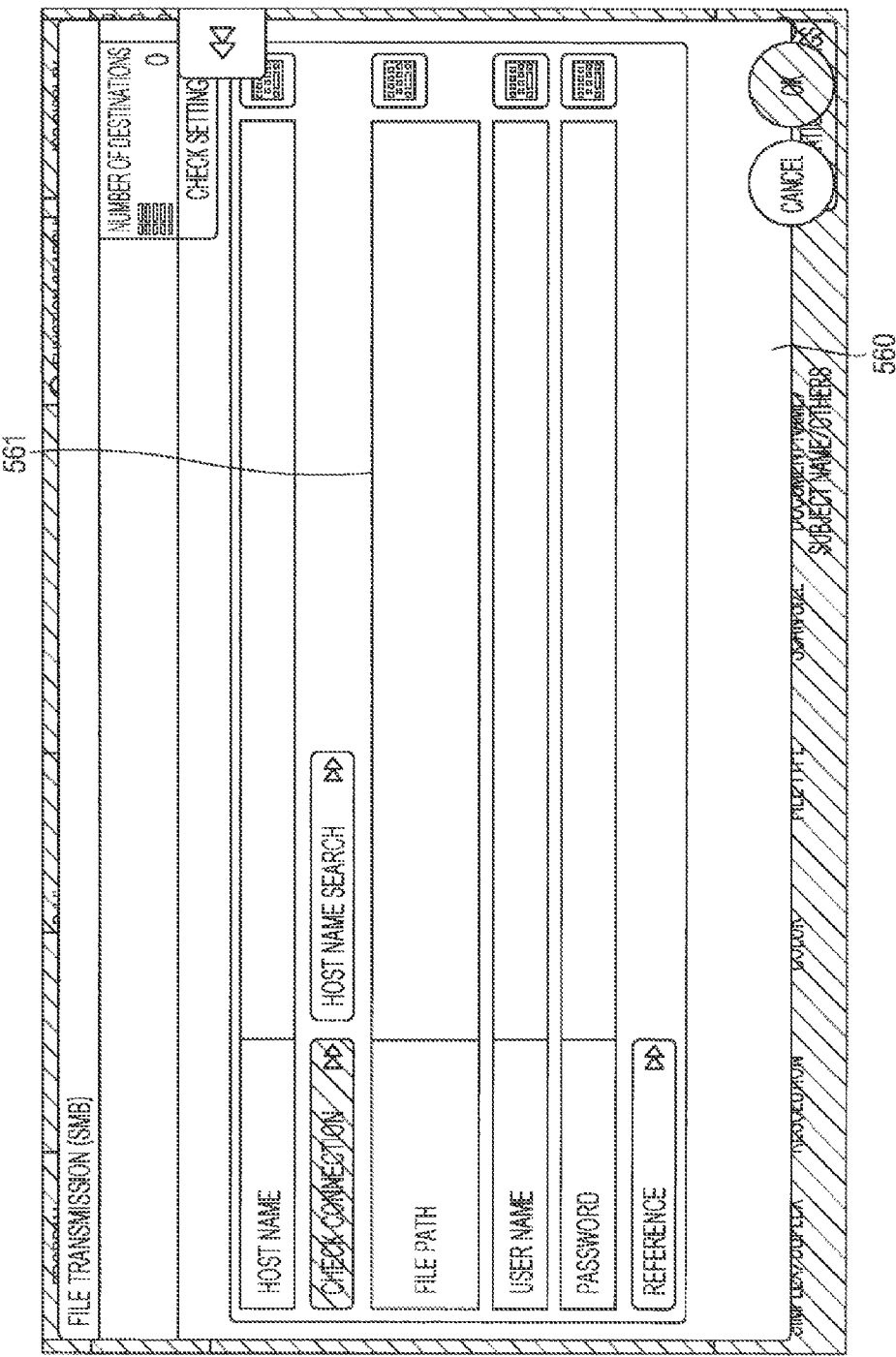
FIG. 20 is an example of a screen corresponding to a type "URL (Uniform Resource Locator)"
Figure 21:
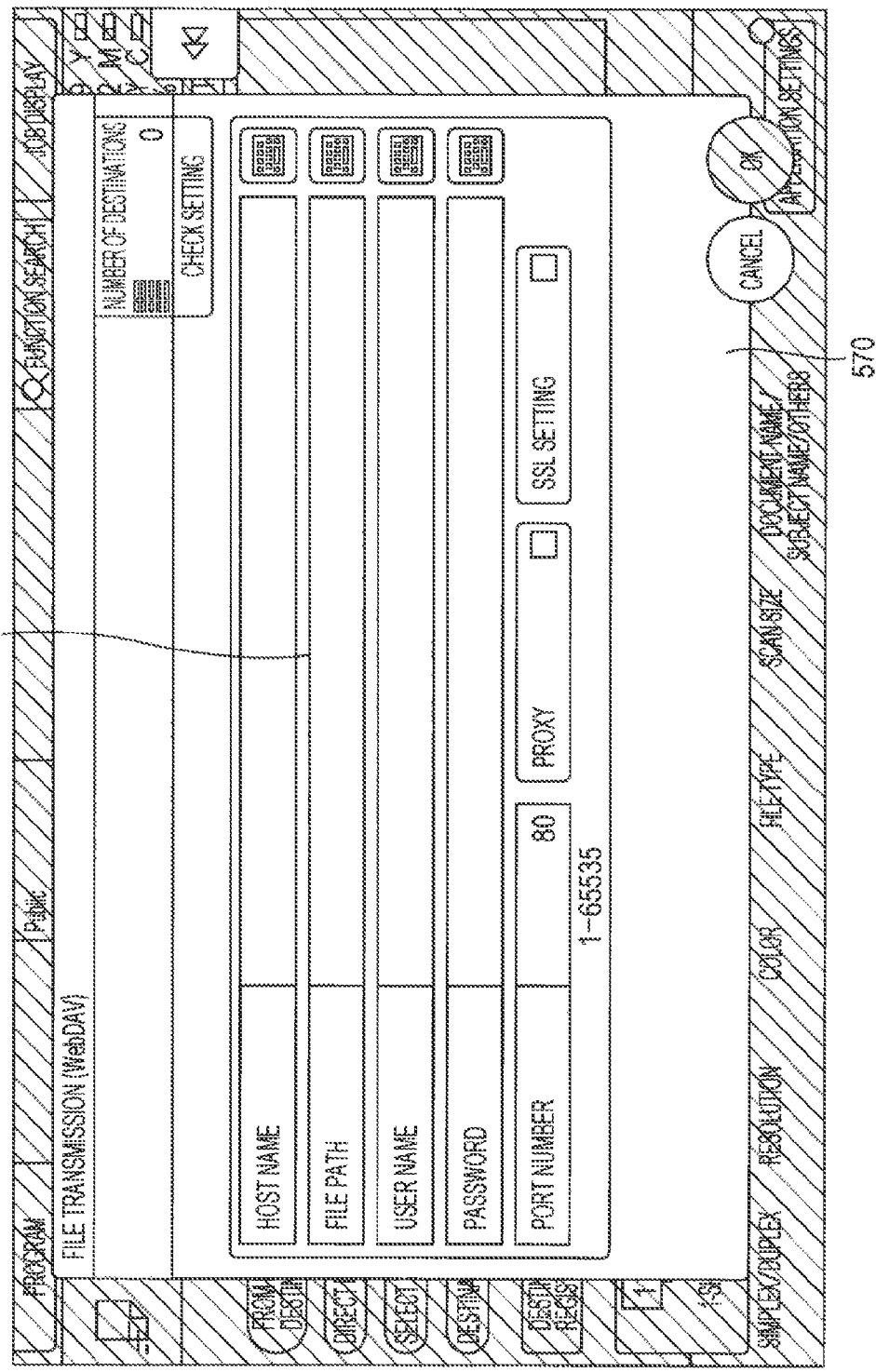
FIG. 21 is an example of a screen corresponding to the type "URL"
Figure 22:
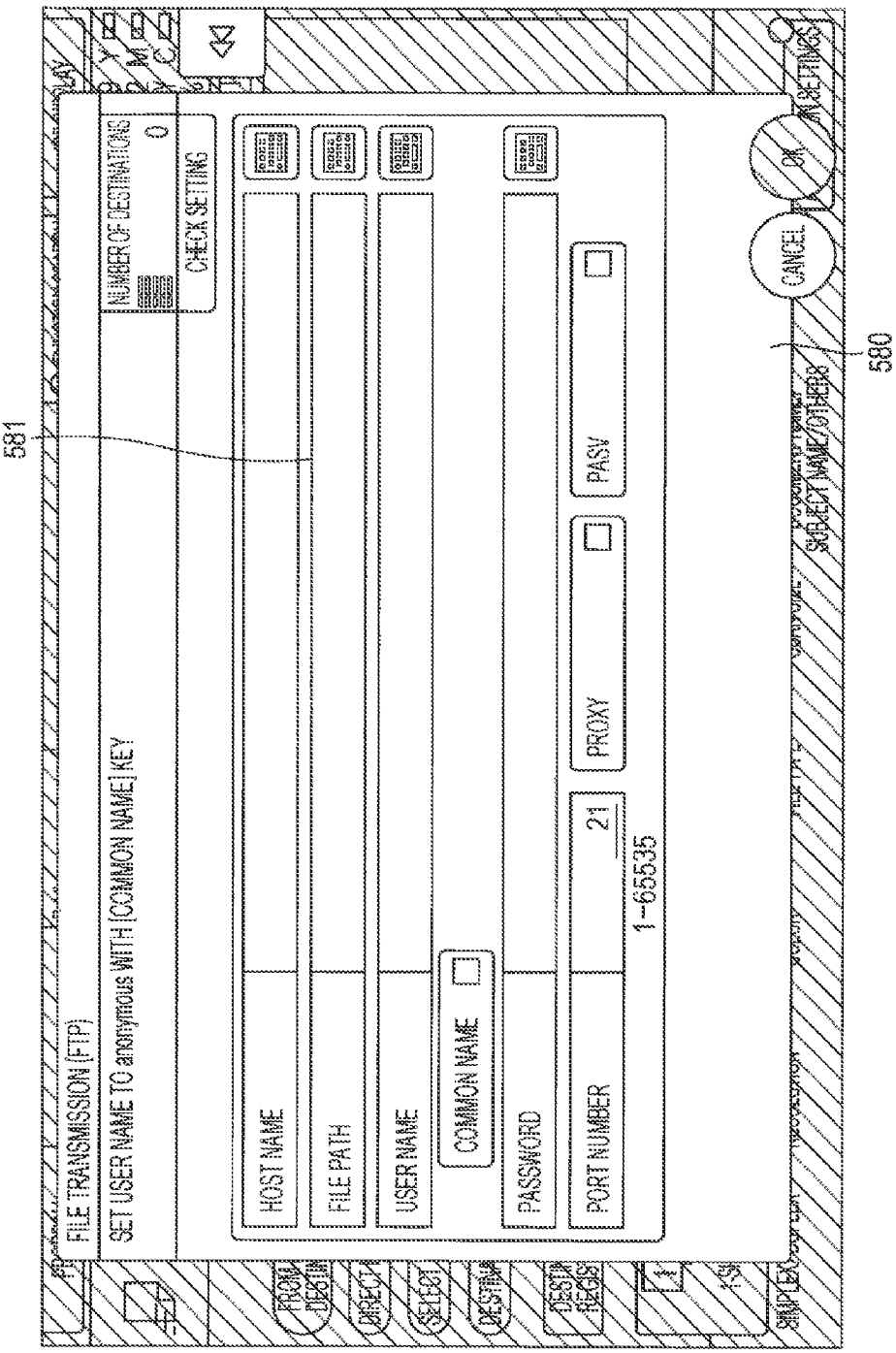
FIG. 22 is an example of a screen corresponding to the type "URL"

A screen 560 of FIG. 20, a screen 570 of FIG. 21, and a screen 580 of FIG. 2 are examples of screens for setting a transmission destination of a file from the MFP 100, respectively. More specifically, the screen 560 is a screen for setting a transmission destination for the transmission of a file in compliance with the SMB (Server Message Block) protocol. The screen 570 is a screen for setting a transmission destination for the transmission of a file in compliance with the WebDAV (Web-based Distributed Authoring and Versioning) protocol. The screen 580 is a screen for setting a transmission destination for the transmission of a file in compliance with the FTP (File Transfer Protocol) protocol. The screens 560, 570, and 580 include input fields 561, 571, and 581 for displaying an input transmission destination, respectively.

If the type of the information input in the information input field 413 is identified as a "URL," the touchscreen 320 displays any of the screens 560, 570, and 580 in the "switching of the operation screen" of FIG. 2. If a protocol is further identified in the type of the input information, the touchscreen 320 displays a screen corresponding to the identified protocol among the screens 560, 570, and 580.

The information transmitted from the communication terminal 400 by the operation on the send button 414 is then input into the input field (any of the input fields 561, 571, and 581) on the displayed screen.

A screen 600 of FIG. 23 (a screen illustrated in the upper part of FIG. 23) is a screen for inputting a main body of an electronic mail document created in the MFP 100. The screen 600 includes an input field 691 for displaying an input main body.

If the type of the information input in the information input field 413 is identified as "text," the touchscreen 320 displays the screen 600 in the "switching of the operation screen" of FIG. 2. The information transmitted from the communication terminal 400 by the operation on the send button 414 is then input into the input field 691.

When a screen 610 for creating an electronic mail (a screen illustrated in the lower part of FIG. 23) is being displayed on the touchscreen 320, if the type of the information input in the information input field 413 is identified as "text," the display of the touchscreen 320 is switched to the screen 600. More specifically, the screen 610 is a screen for creating an electronic mail. The screen 610 includes an input field 611 that displays the name of an attached file, an input field 612 that displays a subtitle of an electronic mail, and an input, field 691 that displays a main body of the electronic mail. On the other hand, the display of the input fields 611 and 612 is omitted on the screen 600 (the upper part of FIG. 23).

Figure 24:
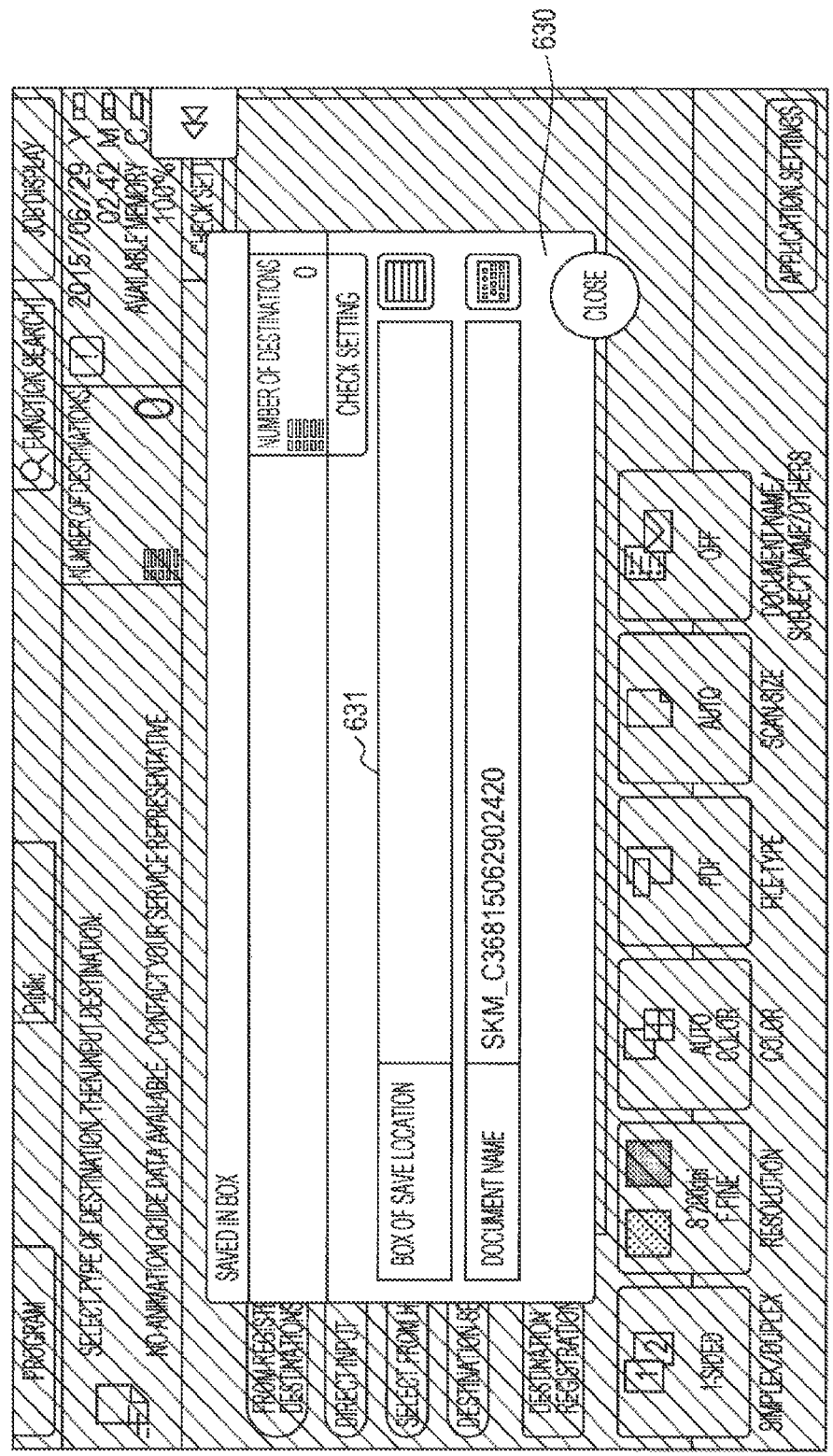
FIG. 24 is an example of a screen corresponding to a type "box name"

A screen 630 of FIG. 24 is a screen for specifying a file save location in the MFP 100. The screen 630 includes an input field 631 for displaying an input box name.

If the type of the information input in the information input field 413 is identified as a "box name," the touchscreen 320 displays the screen 630 in the "switching of the operation screen" of FIG. 2. The information transmitted from the communication terminal 400 by the operation on the send button 414 is then input into the input field 631.

As described above, the touchscreen 320 of the MFP 100 is switched to display a screen of a type in accordance with the type of information input in the information input field 413.

If two or more types are identified as the types of information input in the information input field 413 in an image forming system according to a sixth example, the MFP 100 displays a list indicating the two or more types before switching the screen in the "switching of the operation screen" (FIG. 1). A user of the communication terminal 400 selects one type from the list. In response to this, the MFP 100 displays, on the touchscreen 320, a screen for inputting information of the selected type.

Figure 25:
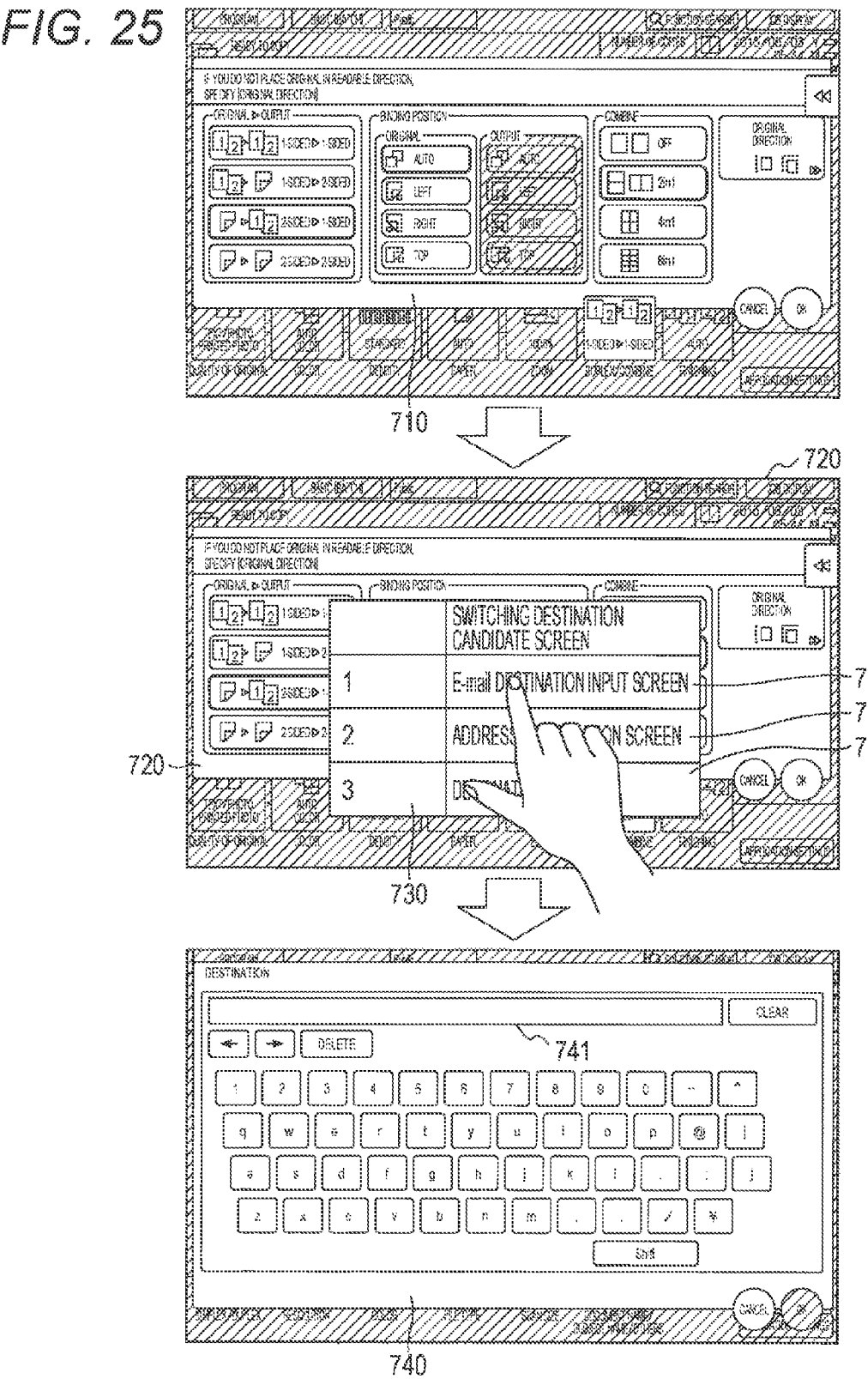
FIG. 25 is a diagram for explaining an example of the transition of a screen in an MFP according to a sixth example.

FIG. 25 is a diagram for explaining an example of the transition of a screen in the MFP 100 according to the sixth example. A description is given of the transition of display on the touchscreen 320 of the MFP 100 if three types "email address," "personal name," and "URL" are identified as the types of information input in the information input field 413, with reference to FIG. 25.

FIG. 25 illustrates three screens 710, 720, and 740. The screen 710 is a screen for inputting settings for an image forming operation in the MFP 100. The screen 720 is a screen including the display of the above list 730. The screen 740 is a screen for inputting an email address.

When the screen 710 is being displayed on the touchscreen 320, the system controller 601 switches the display on the touchscreen 320 if receiving the "input-in-progress notification" (FIG. 2 and the like) from the communication terminal 400. More specifically, if two or more types are identified as the types of the information input in the information input field 413, the system controller 601 displays the screen 720 including the list 730 on the touchscreen 320.

The list 730 is a display for selecting information to be input from the three types "email address," "personal name," and "URL," More specifically, the list 730 includes a field 731 for selecting the type "email address," a field 732 for selecting the type "personal name," and a field 733 for selecting the type "URL." The app on the communication terminal 400 may display, on the display 404, that the list 730 is being displayed, and that it is required to select the type of the information to be input into the MFP 100 from the list 730.

The user performs a touch operation on one of the three fields 731 to 733 to input information on the selection of one type from the three types on the list 730.

When the field 731 is operated, the system controller 601 displays the screen 740 for inputting an "email address" on the touchscreen 320. When the field 732 is operated, the system controller 601 displays a screen for inputting a "personal name" (for example, the screen 530 of FIG. 17) on the touchscreen 320. When the field. 733 is operated, the system controller 601 displays a screen for inputting a "URL" (for example, the screen 560 of FIG. 20) on the touchscreen 320.

As described above, if two or more types are identified as the types of information input in the information input field 413, a list indicating the two or more types is displayed in the MFP 100, A screen for inputting information of a type selected from the list is then displayed in the MFP 100.

The list may be displayed on the display 404 of the communication terminal 400. The user operates the input device 405 to select a type from the list. The CPU 401 transmits, to the MFP 100, information indicating which type has been selected. In response to this, the system controller 601 displays a screen for inputting information on the type selected in the communication terminal 400, on the touchscreen 320 in the "switching of the operation screen" (FIG. 2 and the like).

According to one or more embodiments of the present invention, while information to be input into an image forming apparatus is being input into a communication terminal, the status of the image forming apparatus is changed to a status that can input the information. Consequently, when the communication terminal inputs the information into the image forming apparatus, the image forming apparatus can securely accept the input of the information. Therefore, the need for a user's operation of changing the status of the image forming apparatus is eliminated.

According to one or more embodiments of the present invention, the communication terminal issues a notification not before the information is input but when the information is being input. Consequently, it is possible to avoid an issuance of a needless notification when a user of the communication terminal does not intend to transmit the information to the image forming apparatus.

According to one or more embodiments of the present invention, the communication terminal issues a notification before the information is transmitted. Consequently, the user of the communication terminal can check a user of the image forming apparatus before transmitting the information to the image forming apparatu.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image forming system comprising:
an image forming apparatus; and
a communication terminal, wherein
the image forming apparatus communicates with the communication terminal and comprises:
an operation panel that displays a first display screen and accepts an operation of inputting information in accordance with the first display screen, and
a hardware processor that controls operation of the operation panel,
the communication terminal communicates with the image forming apparatus and displays a second display screen and accepts input of information to be input into the image forming apparatus in accordance with the second display screen,
the communication terminal comprises a central processing unit (CPU) that notifies the input of the information to the image forming apparatus in response to the input of the information into the communication terminal while the input of the information is in progress,
the communication terminal transmits the information input in the communication terminal to the image forming apparatus, and
the hardware processor:
determines whether the status of the operation panel is a status that accepts the operation of inputting the information in response to the notification from the CPU, and
upon the status of the operation panel being the status that does not accept the operation of inputting the information, switches the first display screen of the operation panel to a screen that accepts the operation of inputting the information.

2. The image forming system according to claim 1, wherein
the communication terminal authenticates a user who is inputting the information into the communication terminal,
the CPU notifies the image forming apparatus of information identifying the user authenticated by the communication terminal, and
the hardware processor:
authenticates a user who is operating the operation panel, and
switches the first display screen of the operation panel to the screen that accepts the operation of inputting the information on condition that the user who is operating the operation panel is the user authenticated by the communication terminal.

3. The image forming system according to claim 1, wherein
the hardware processor notifies the communication terminal that the operation panel is accepting the input, and
the CPU, upon having been notified by the image forming apparatus that the operation panel is accepting the input operation, stands by without inputting the information into the image forming apparatus.

4. The image forming system according to claim 1, wherein
the hardware processor notifies the communication terminal that the operation panel is not accepting the input operation, and
the CPU notifies the image forming apparatus of the input of the information into the communication terminal on condition that the image forming apparatus has notified that the operation panel is not accepting the input operation.

5. The image forming system according to claim 4, wherein the hardware processor, upon the operation panel having not accepted the input operation continuously for a certain period of time, notifies the communication terminal that the operation panel is not accepting the input operation.

6. The image forming system according to claim 1, wherein
the notification of the input of the information from the CPU includes information that identify the type of the information input in the communication terminal, and
the hardware processor switches the first display screen of the operation panel to a screen that accepts an operation of inputting the information on the type of the information input in the communication terminal.

7. The image forming system according to claim 6, wherein
the type of the information input in the communication terminal is a name of a person, and
the hardware processor switches the first display screen to a screen for registering the information input into an address book.

8. The image forming system according to claim 6, wherein
the type of the information input in the communication terminal is a fax number, and
the hardware processor switches the first display screen to a screen for registering an address book, or to a screen for inputting a destination of fax transmission.

9. The image forming system according to claim 6, wherein
the type of the information input in the communication terminal is an electronic mail address, and
the hardware processor switches the first display screen to a screen for inputting a destination of an electronic mail.

10. The image forming system according to claim 6, wherein
the type of the information input in the communication terminal is a URL (Uniform Resource Locator), and
the hardware processor switches the first display screen to a screen for inputting a destination of file transmission.

11. The image forming system according to claim 6, wherein
the type of the information input in the communication terminal is text, and
the hardware processor switches the first display screen to a screen for inputting a main body of an electronic mail.

12. The image forming system according to claim 6, wherein
the image forming apparatus further comprises a storage device,
the storage device stores information assigning a name identifying each of one or more storage areas,
the type of the information input in the communication terminal is a name identifying the storage area, and
the hardware processor switches the first display screen to a screen for inputting a name of a storage area of information in the storage device.

13. The image forming system according to claim 6, wherein
the hardware processor:
upon a plurality of types having been identified as the types of the information input in the communication terminal, displays, on the operation panel, information for accepting the selection of one type from the plurality of types, and
switches the first display screen of the operation panel to a screen for inputting information on the selected type.

14. The image forming system according to claim 1, wherein
the hardware processor further;
determine whether the first display screen is a screen that accepts the operation of inputting character information in response to the notification from the CPU, and
upon the first display screen being the screen that does not accept the operation of inputting the character information, switch the first display screen of the operating unit to a screen that accepts the operation of inputting the information.

15. An image forming apparatus that communicates with a communication terminal, the image forming apparatus comprising:
an operation panel that displays a first display screen and accepts an operation of inputting information in accordance with the first display screen; and
a hardware processor that controls operation of the operation panel, wherein
that the image forming apparatus receives, from the communication terminal, a notification indicating that information to be input into the image forming apparatus is being input in accordance with a second display screen displayed on the communication terminal while the input of the information is in progress, and
the hardware processor:
determines whether the operation panel is in a status that accepts the operation of inputting the information in response to the notification from the communication terminal, and
upon the operation panel being in a status that does not accept the operation of inputting the information, switches the first display screen of the operation panel to a screen that accepts the operation of inputting the information.

16. The image forming apparatus according to claim 15, wherein
the hardware processor further:
determine whether the first display screen is a screen that accepts the operation of inputting character information in response to the notification from the communication terminal, and
upon the first display screen being the screen that does not accept the operation of inputting the character information, switch the first display screen of the operating unit to a screen that accepts the operation of inputting the information.

17. A non-transitory recording medium storing a computer readable program to be executed by a hardware processor of an image forming apparatus capable of communicating with a communication terminal comprising:
the image forming apparatus, wherein
the image forming apparatus includes an operation panel that accepts an operation of inputting information, and
the program causes the hardware processor to execute:
displaying a first display screen on the operation panel,
receiving, from the communication terminal, a notification indicating that the information to be input into the image forming apparatus is being input in accordance with a second display screen displayed on the communication terminal while the input of the information is in progress,
determining whether the operation panel is in a status that accepts the operation of inputting the information in response to the notification from the communication terminal, and upon the operation panel being in a status that does not accept the operation of inputting the information, switching the first display screen of the operation panel to a screen that accepts the operation of inputting the information.

18. The non-transitory recording medium according to claim 17, wherein the program causes the hardware processor to further execute:

determining whether the first display screen is a screen that accepts the operation of inputting character information in response to the notification from the communication terminal, and upon the first display screen being the screen that does not accept the operation of inputting the character information, switching the first display screen of the operating unit to a screen that accepts the operation of inputting the information.

* * * * *